(12) United States Patent
Gerstner et al.

(10) Patent No.: US 8,930,334 B2
(45) Date of Patent: Jan. 6, 2015

(54) CREATING A DATABASE THAT STORES INFORMATION ABOUT INDIVIDUAL HABITABLE UNITS

(75) Inventors: Brad Gerstner, Boston, MA (US);
Calvin Yang, Foster City, CA (US);
Kevin Fliess, Mountain View, CA (US);
Hee-Jung Jones, San Francisco, CA (US); Syed Abbas, Santa Clara, CA (US)

(73) Assignee: Room 77, Inc., San Francisco, CA (US)

( * ) Notice: Subject to any disclaimer, the term of this patent is extended or adjusted under 35 U.S.C. 154(b) by 45 days.

(21) Appl. No.: 13/208,147

(22) Filed: Aug. 11, 2011

(65) Prior Publication Data

US 2012/0066275 A1 Mar. 15, 2012

Related U.S. Application Data

(60) Provisional application No. 61/403,070, filed on Sep. 10, 2010, provisional application No. 61/465,508, filed on Mar. 21, 2011.

(51) Int. Cl.
*G06F 7/00* (2006.01)
*G06F 17/30* (2006.01)

(52) U.S. Cl.
CPC .... *G06F 17/30241* (2013.01); *G06F 17/30061* (2013.01)
USPC ........................................................ 707/705

(58) Field of Classification Search
None
See application file for complete search history.

(56) References Cited

U.S. PATENT DOCUMENTS 5,614,703 A 3/1997 Martin et al.
5,948,040 A * 9/1999 DeLorme et al. ............. 701/426
7,003,136 B1 * 2/2006 Harville ......................... 382/103

(Continued)

FOREIGN PATENT DOCUMENTS

JP 2003-242377 8/2003
KR 10-2009-0073424 7/2009
WO WO 2010/089771 A2 8/2010

OTHER PUBLICATIONS

"Notification of Transmittal of the International Search Report and the Written Opinion of the International Searching Authority, or the Declaration" received in PCT International Application No. PCT/US11/49748 dated May 2, 2012 (9 pages).

(Continued)

*Primary Examiner* — Taelor Kim
(74) *Attorney, Agent, or Firm* — Hickman Palermo Truong Becker Bingham Wong LLP; Daniel D. Ledesma

(57) ABSTRACT

Techniques for creating and searching a database that stores information about a plurality of individual habitable units (IHUs) are provided. An example of an IHU is a hotel room. Image data that depicts where a plurality of IHUs reside relative to each other is placed on a base image, such as a satellite/map image. The base image is associated with a mapping that maps points on the base image to spatial (e.g., geographical) coordinates. The coordinates of the IHU may be used to generate a computer-rendered view from a window of an IHU. Also, label input is received that labels each IHU reflected in the image data with certain information. Each label indicates a value of an attribute of an IHU, such as its size, price, distance from elevators, etc. A query that targets information about each IHU may be processed and results returned that are ranked based on criteria associated with the query.

44 Claims, 12 Drawing Sheets

(56) References Cited

U.S. PATENT DOCUMENTS

| | | |
|---|---|---|
| 7,076,451 B1 | 7/2006 | Coupland et al. |
| 7,134,088 B2 * | 11/2006 | Larsen ............ 715/765 |
| 7,170,407 B2 | 1/2007 | Wagner |
| 7,584,110 B2 | 9/2009 | Robertson |
| 7,644,032 B2 | 1/2010 | Etkin |
| 7,979,457 B1 | 7/2011 | Garman |
| 2002/0152127 A1 * | 10/2002 | Hamilton et al. ............ 705/26 |
| 2003/0040946 A1 | 2/2003 | Sprenger et al. |
| 2003/0058283 A1 * | 3/2003 | Larsen ............ 345/810 |
| 2003/0120523 A1 | 6/2003 | Jafri et al. |
| 2003/0208386 A1 | 11/2003 | Brondrup |
| 2004/0162840 A1 * | 8/2004 | Rappaport et al. ............ 707/100 |
| 2006/0100722 A1 * | 5/2006 | Bell ............ 700/59 |
| 2006/0149586 A1 | 7/2006 | Brown |
| 2006/0173617 A1 | 8/2006 | Sladky et al. |
| 2007/0043770 A1 | 2/2007 | Goodrich et al. |
| 2007/0067193 A1 | 3/2007 | Robertson |
| 2007/0073562 A1 | 3/2007 | Brice et al. |
| 2007/0074471 A1 | 4/2007 | Gallagher |
| 2007/0110338 A1 * | 5/2007 | Snavely et al. ............ 382/305 |
| 2007/0156660 A1 | 7/2007 | Moricz |
| 2008/0126022 A1 * | 5/2008 | Hoguet ............ 703/1 |
| 2008/0172244 A1 | 7/2008 | Coupal et al. |
| 2008/0174598 A1 * | 7/2008 | Risenhoover ............ 345/419 |
| 2008/0192053 A1 * | 8/2008 | Howell et al. ............ 345/427 |
| 2008/0215626 A1 * | 9/2008 | Gomez ............ 707/104.1 |
| 2008/0275673 A1 * | 11/2008 | Klipfel ............ 703/1 |
| 2008/0319803 A1 | 12/2008 | Heyraud et al. |
| 2009/0063167 A1 | 3/2009 | Bartot et al. |
| 2009/0182636 A1 | 7/2009 | Gilula |
| 2009/0262206 A1 * | 10/2009 | Park ............ 348/218.1 |
| 2009/0287596 A1 | 11/2009 | Torrenegra |
| 2009/0307020 A1 * | 12/2009 | Viale et al. ............ 705/5 |
| 2010/0023252 A1 * | 1/2010 | Mays et al. ............ 701/201 |
| 2010/0293011 A1 | 11/2010 | Lebreton et al. |
| 2010/0305984 A1 | 12/2010 | Ben-Yitschak et al. |
| 2011/0055284 A1 * | 3/2011 | Wallace et al. ............ 707/802 |
| 2011/0099038 A1 | 4/2011 | Nishida |
| 2011/0218830 A1 | 9/2011 | Gonzalez et al. |
| 2011/0288892 A1 | 11/2011 | Desy et al. |
| 2012/0066013 A1 * | 3/2012 | Natsuyama et al. ............ 705/5 |
| 2012/0131050 A1 | 5/2012 | Nagashima et al. |

OTHER PUBLICATIONS

Current Claims in PCT International Application No. PCT/US11/49748 dated May 2012 (7 pages).

Korean Patent Office, "International Search Report", in application No. PCT/US2012/064240 dated Mar. 29, 2013, 10 pages.

Current Claims in application No. PCT/US2012/064240 dated Mar. 2013, 6 pages.

* cited by examiner

CREATING A DATABASE THAT STORES INFORMATION ABOUT INDIVIDUAL HABITABLE UNITS

CROSS-REFERENCE TO RELATED APPLICATION; BENEFIT CLAIM

This application claims the benefit of U.S. Provisional Application 61/403,070, filed Sep. 10, 2010, the entire contents of which are hereby incorporated by reference as if fully set forth herein, under 35 U.S.C. §119(e).

This application also claims the benefit of U.S. Provisional Application 61/465,508, filed Mar. 21, 2011, the entire contents of which are hereby incorporated by reference as if fully set forth herein, under 35 U.S.C. §119(e).

This application is related to U.S. patent application Ser. No. 13/208,153 entitled, "SEARCHING A DATABASE THAT STORES INFORMATION ABOUT INDIVIDUAL HABITABLE UNITS" and filed Aug. 11, 2011, the entire contents of which are hereby incorporated by reference as if fully set forth herein.

FIELD OF THE INVENTION

The present invention relates to creating a database that stores information about individual habitable units (IHUs) based on floor plans of the IHUs.

BACKGROUND

When planning a vacation or a business trip, many users use travel web sites that provide information about multiple hotels to make a reservation. However, travel web sites are limited in that very little information about each hotel is presented to the user. For example, a typical travel web site might display an address for a hotel, a price range accepted by the hotel, and one or more snapshots of the hotel grounds and perhaps one or more "show" rooms.

Travel web sites do not typically have information about individual rooms. In other words, a user may not be able to tell if the reservation she makes through the travel website is for a room on the ground floor, a room with a particular view, a room with a specific amount of square footage, or a room that is close to an elevator or stairs. Instead, the user must contact the hotel directly to determine some of this information, while some of this information may not be available at all.

DETAILED DESCRIPTION

Figure 1:
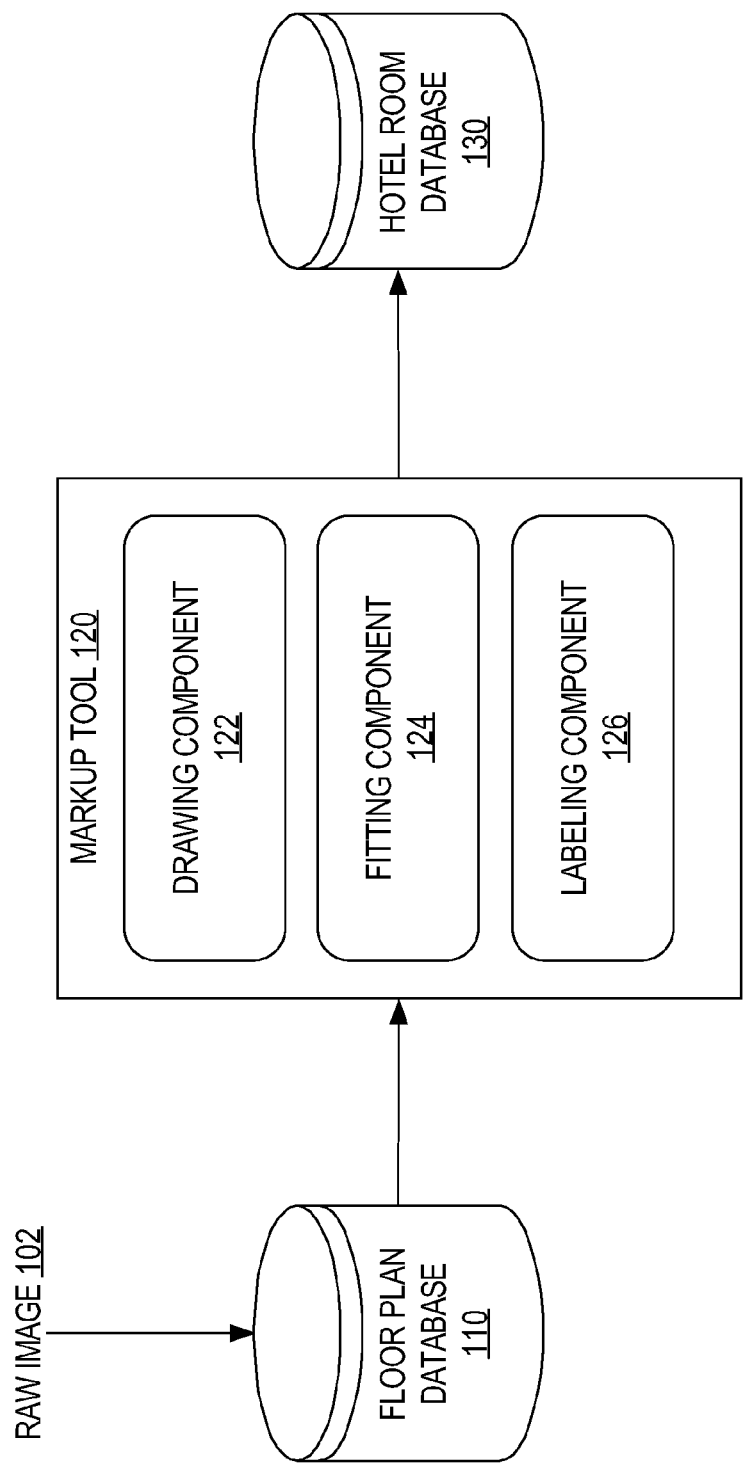
FIG. 1 is a block diagram that depicts a system for creating a database that stores information about many individual habitable units, according to an embodiment of the invention.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Individual Habitable Units

An individual habitable unit is a structure that one or more persons may reside in for a period of time. Non-limiting examples of IHUs include hotel rooms, motel rooms, houses, rooms in a house, apartments, condominiums, cottages, cabins, lodges, and bungalows. Thus, an IHU may be purchased or rented by one or more individuals. A set of IHUs may be owned, managed, and maintained as a single entity or establishment (e.g., Hilton™ or Courtyard by Marriot™), which may consist of one or more building structures. Non-limiting examples of such building structures include hotels, motels, apartment complexes, and a condominium complex. A set of IHUs that are maintained or managed by a single business entity or establishment may cover just a few acres of land, although some larger complexes, such as vacation resorts, may consist of IHUs that are spread across a square mile or two. A single business entity or establishment may own or manage different sets of IHUs in different locations, such as one set of IHUs in San Francisco, Calif. and another set of IHUs in Las Vegas, Nev.

An IHU may consist of a single room. However, some IHUs consist of two or more rooms, which might be divided by a wall (or other divider) that includes a door between two rooms of the same IHU.

Also, many IHUs, like many hotel and motel rooms, have one or more walls that adjoin another IHU. IHUs form a "contiguous set" when each IHU in the set shares a wall with at least one other IHU in the set. However, in some cases, IHUs that are part of the same complex do not share walls with any other IHUs in the set. For example, a business entity may own a set of separately-situated bungalows or cottages within a small geographical area, such as a few acres.

Many building structures that include multiple IHUs comprise multiple floors, with multiple IHUs on each floor. In many cases, each floor of such a building structure has the same floor plan. Thus, the set of IHUs on one floor might have the same dimensions and arrangement as another set of IHUs on another floor of the same building.

For purposes of brevity, examples shall be given hereafter in which the IHUs are hotel rooms, and the building complexes to which the IHUs belong are hotels. However, the techniques described herein are not limited to any particular type of IHU or building complex.

Overview of Creating a Database of Hotel Rooms

Techniques are provided herein for creating a database that maintains information about hundreds or thousands of hotel rooms. As mentioned above, the same techniques are equally applicable to creating a database for other types of IHUs.

Creating such a database involves three main steps that, in one embodiment, are performed at least once for each hotel: a drawing step, a fitting step, and a labeling step. Each of these steps shall be described in greater detail hereafter.

In one embodiment, during the drawing step, an image of a hotel's floor plan is displayed to a "system" user (as opposed to an "end-user" that submits search queries against a database of hotel rooms that are generated after these three steps). The system user provides draw input that indicates boundaries of each hotel room that is located in the area represented by the floor plan image. The result of processing the draw input is a drawn image that reflects the boundaries of each "drawn" hotel room indicated in the floor plan. As part of the fitting step, a system user provides fitting input that causes the drawn image to be placed on a map that is associated with geographical coordinates. The map may display a satellite view of the hotel that is based on the floor plan. The fitting input may also cause the drawn image to be scaled and rotated to better match the hotel depicted in the map. Alternatively, the fitting input may cause the map to be scaled and rotated to better match the drawn image.

As part of the labeling step, a system user provides label input that labels each hotel room reflected in the drawn image. The label input may indicate a room number for each hotel room and one or more other details about each hotel room, such as a room category that describes characteristics about the hotel room, the number and size of beds in the hotel room, and a floor at which the hotel room is located.

System Overview

FIG. 1 is a block diagram that depicts a system 100 for creating a database that stores information about many hotel rooms, according to an embodiment of the invention. System 100 comprises a floor plan database 110, a markup tool 120, and a hotel room database 130. Although depicted as separate databases, databases 110 and 130 may be on the same physical storage device. Databases 110 and 130 may comprise volatile and/or non-volatile storage.

Floor plan database 110 stores digital images of multiple floor plans of multiple hotels, which may be owned and operated by different entities. Each digital image may be in one of many different image formats including, but not limited to, JPEG, PNG, GIF, BMP, RAW, and TIFF.

Some hotels only consist of a single building with a single floor. In that case, only a single digital image of a floor plan is necessary. If a hotel consists of multiple single story buildings that have different floor plans, then a single image of each floor plan may be required in order to obtain information about each hotel room in the hotel. Many hotels consist of a single building with multiple floors. Some of such hotels have the same floor plan for each floor. Therefore, in that case, only a single image of a single floor plan is necessary to obtain information about each hotel room in the hotel. To the extent that different floors of a hotel have different floor plans, a single image of each different floor plan may be necessary to obtain accurate information about each hotel room in the hotel.

Floor Plan

A hotel floor plan may be acquired in many ways. For example, a person (such as a hotel employee or a patron of the hotel) can take a picture of a hotel floor plan and email the picture to a person with access to floor plan database 110. Similarly, a person can provide (e.g., mail) a printed copy of a hotel floor plan to another person with access to floor plan database 110. As another example, an employee of a hotel may have access to a computer terminal that is capable of causing a digital image to be sent directly to floor plan database 110.

Because a digital image of a hotel floor plan is simply a set of pixel values that indicate nothing about various characteristics of hotel rooms, markup tool 120 is provided to allow a system user to create, based on the digital image, a virtual floor plan that includes different hotel objects reflected in the digital image. The virtual floor plan makes it possible to derive information about hotel rooms, information that would be interesting to an end-user that is searching for a hotel room to reserve.

System Overview (Cont.)

Markup tool 120 is a software application for marking a floor plan. In one embodiment, markup tool 120 includes a drawing component 122, a fitting component 124, and a labeling component 126. Markup tool 120 may execute on one or more computing devices.

In an alternative embodiment, each component of markup tool 120 is a separate software application that may or may not execute on separate computing devices. In this way, each component of markup tool 120 may be developed and maintained individually from the other components of markup tool 120.

Drawing component 122 receives, as input, a digital image from floor plan database 110. While a digital image from floor plan database 110 is being displayed (by a display device not shown), drawing component 122 also receives, from a system user, input that indicates boundaries of multiple hotel rooms indicated in the digital image. Drawing component 122 produces a "drawn" image that is based on the "drawing" input and the digital image. The drawn image is provided to fitting component 124.

While a map of the hotel that corresponds to the hotel floor plan is displayed, fitting component 124 receives, from a system user, "fitting" input that moves the drawn image on the map. The display of the map may include a satellite image of the hotel to assist the system user providing the input in making the proper size and orientation adjustments. In addition to moving the drawn image, the "fitting" input may comprise scaling the drawn image, either increasing or decreasing the display size of the drawn image.

Labeling component 126 receives "labeling" input that labels each hotel room indicated in the drawn image with certain information. Labeling input may be received before or after fitting component 124 moves the drawn image on the map. The information for each hotel room indicated in the drawn image may include a room number for the hotel room, a category (or type) of hotel room, the number of beds in the hotel room, the type of bed(s) in the hotel room, and the floor on which the hotel room is located.

Finally, the labeling information for the hotel floor plan is stored in hotel room database 130 along with information about hotels that are unaffiliated with the hotel of the hotel floor plan. One or more computing devices can query hotel room database 130 for information about multiple hotel rooms of a single hotel or multiple hotel rooms from different, unaffiliated hotels.

Drawing Boundaries Around Hotel Rooms

Figure 2:
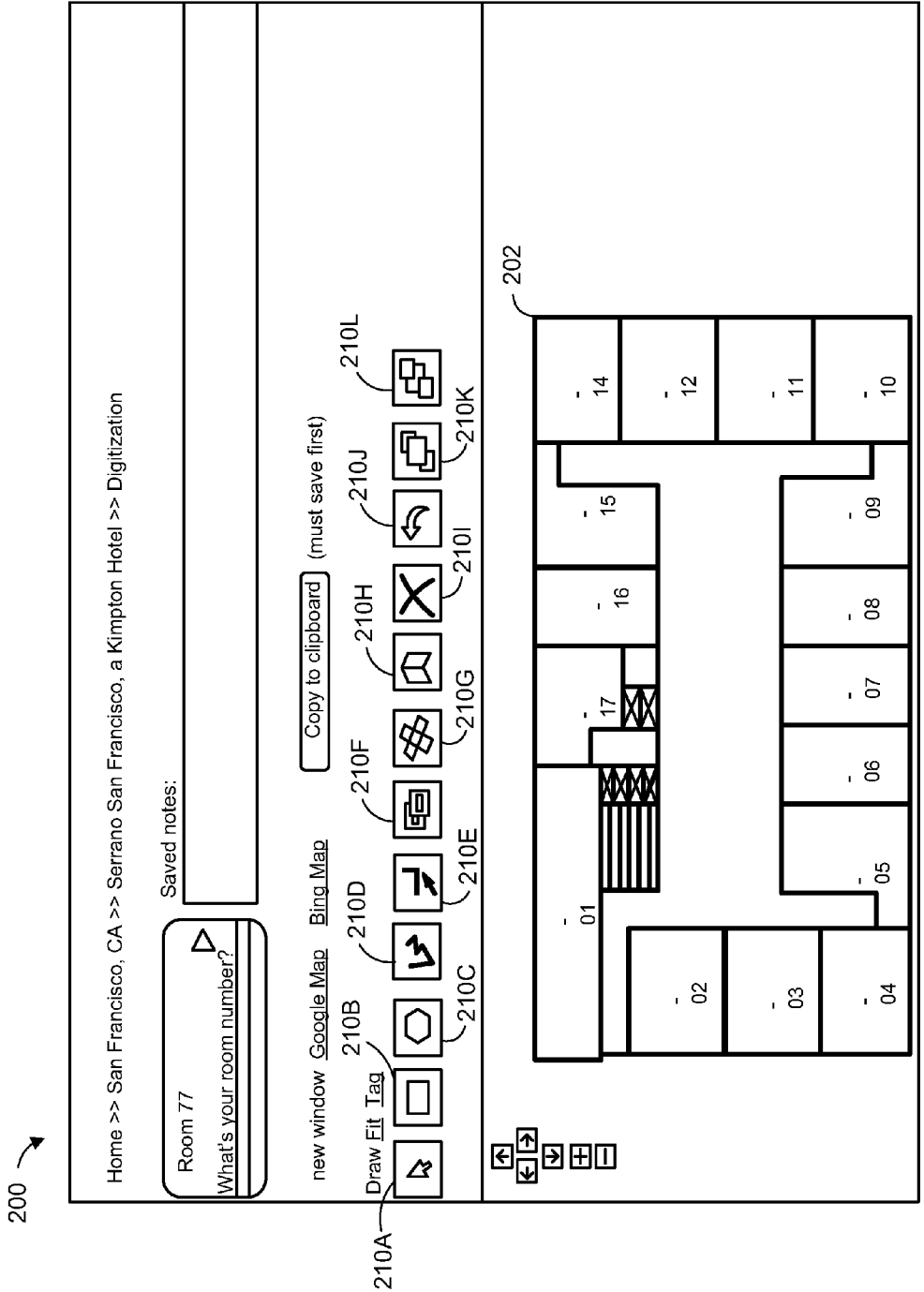
FIG. 2 is a screenshot of a user interface that allows one or more users to provide input that specifies hotel objects depicted in a digital image of a hotel floor plan, according to an embodiment of the invention.

FIG. 2 is a screenshot of a user interface 200 that allows one or more system users to provide input that specifies hotel objects depicted in a digital image of a hotel floor plan, according to an embodiment of the invention. User interface 200 is an element of drawing component 122.

User interface 200 displays multiple tools 210A-L that allow a system user to indicate, on a digital image of a hotel floor plan (or simply "floor plan image"), various objects indicated in the floor plan image. Thus, while a floor plan image is displayed, a system user may use user interface 200 and the floor plan image to draw boundaries of each hotel room reflected in the floor plan image and, optionally, other objects (e.g., elevators and stairs) reflected in the floor plan image. The inputs that cause hotel objects to be drawn or displayed on a computer screen are referred to as "draw inputs."

The objects that are drawn using user interface 200 may be displayed in an area, of a computer screen, that is the same as or different than the area of the computer screen in which the floor plan image is displayed. For example, the floor plan image may be displayed in a top right corner of the computer screen while objects are drawn in another area of the computer screen. As another example, the floor plan image may be centered on the computer screen and take up a majority of the computer screen while objects are drawn seemingly "on" the floor plan image. In this way, hotel objects are drawn by "tracing" corresponding objects depicted in the floor plan image. Such tracing may allow for the automatic determination of the most accurate information for hotel rooms, such as room size, the room view, and various distances, such distance from elevators and distance from stairs.

Alternatively, a floor plan image is not displayed while hotel objects are drawn. For example, a system user may draw boundaries of multiple hotel rooms of a hotel based on the system user's memory or based on a hard copy of a floor plan on a desk adjacent to a computing device that accepts the draw inputs. In other words, displaying a floor plan image concurrently while receiving the draw inputs is not required.

The type and number of tools 210A-L provided by user interface 200 may vary widely. Object selector 210A allows a system user to select an object displayed via user interface 200. Rectangle shape tool 210B allows a system user to draw a square or a rectangle shape, which is the basis for drawing rooms. Custom shape tool 210C allows a system user to draw custom (i.e., a non-rectangular) shape. Line draw tool 210D allows a system user to draw lines.

Snap tool 210E allows two objects to "snap" together. Snap tool 210E is helpful when there are two distinct objects that a system user desires to be adjacent to one another. Without snap tool 210E, the system user would have to manually adjust one object relative to another to fit together exactly.

Copy tool 210F allows an object to be copied. One example of using copy tool 210F is when there are multiple rooms, on a particular floor, that have the same shape and individual floor plan. Thus, if there are 20 hotel rooms that have the same floor plan, then only one hotel room needs to be drawn by the system user (e.g., using rectangle shape tool 210B) and then the system user selects the copy tool 210F to generate 19 copies of the drawn hotel room.

Copy adjacent tool 210G allows an object to be copied, but only to an area that is adjacent to the object. A difference between copy adjacent tool 210G and copy tool 210F is that copy tool 210F can be used to copy an object and the copy can be moved to any area in the drawing. With copy adjacent tool 210G, on the other hand, a system user is limited to moving the copy onto a side of the original object. For example, if the original object is a square, then the copy can be applied to one of the four sides of the original object. However, an entire side of the copy is not required to touch an entire side of the original object. Instead, a portion of a side of the copy must touch a portion of a side of the original object.

Mirror tool 210H allows a mirror image copy of an object to be created. This tool is helpful given the fact that many hotel rooms in a single building or complex are mirror images of another hotel room in the same building or complex.

Once an object is created using one of these tools, the object may be further modified by moving, rotating (i.e., clockwise or counterclockwise), and scaling the object to match a corresponding object reflected in the floor plan image.

Delete tool 210I allows an object to be deleted. Undo tool 210J allows a prior action to be undone. Selection of a hide drawing tool 210K causes the drawing to be hidden (at least temporarily) or made translucent so that the floor plan image can be viewed more easily with less obstruction from the drawing. Similarly, selection of a hide image tool 210L causes the floor plan image to be hidden (at least temporarily) or made translucent so that the drawing that a system user is creating can be viewed more easily with less obstruction from the floor plan image.

After an object is drawn (e.g., using rectangle shape tool 210B or custom shape tool 210C), the object can be designated as being of one of many types of hotel objects, such as a hotel room, an elevator, stairs, pool, ice, lobby, gym, vending area, cleaning services, and restaurant. A drawn object may be designated as one type of hotel object by, for example, a drop down menu available on user interface 200 or right-clicking the object and selecting a particular hotel object type from a list of object types that are displayed in response to right-clicking the object. Alternatively, a system user may be allowed to provide any label to drawn object, regardless of whether an appropriate hotel object type is available for the drawn object. For example, a system user may be able to designate a drawn object as a "Concierge Lounge."

When a hotel object type that is recognized by drawing component 122 is used to designate a drawn object, drawing component 122 might automatically mark the object to visually distinguish the object from other drawn objects. For example, if an object is designated as an elevator, then drawing component marks the object with an "X." As another example, if an object is designated as stairs, then drawing component marks the object with perpendicular or vertical lines.

In a related embodiment, instead of drawing objects and then designating the objects, user interface 200 might include a different tool for each hotel object. Thus, user interface 200 might include a hotel room tool, a stairs tool, an elevator tool, a window tool, etc.

User interface 200 may include a window tool (not shown) for creating window objects. For example, after selecting the window tool, a system user selects a side of a hotel room object and a window object is created and displayed between the ends of the selected side. The window object may be adjusted along the selected side. Alternatively, window objects may be created during the fitting step, which is described in detail below.

The result of receiving all the inputs while the floor plan image is displayed is a drawn image. The drawn image includes hotel objects (e.g., hotel walls/boundaries, stairs, elevators, doors, windows, etc.) that correspond to hotel objects depicted in the floor plan image as initially displayed by user interface 200 (i.e., before any system user inputs were received). The drawn image may now be fit on a map.

Fitting Room Boundaries onto a Base Image

Figure 3:
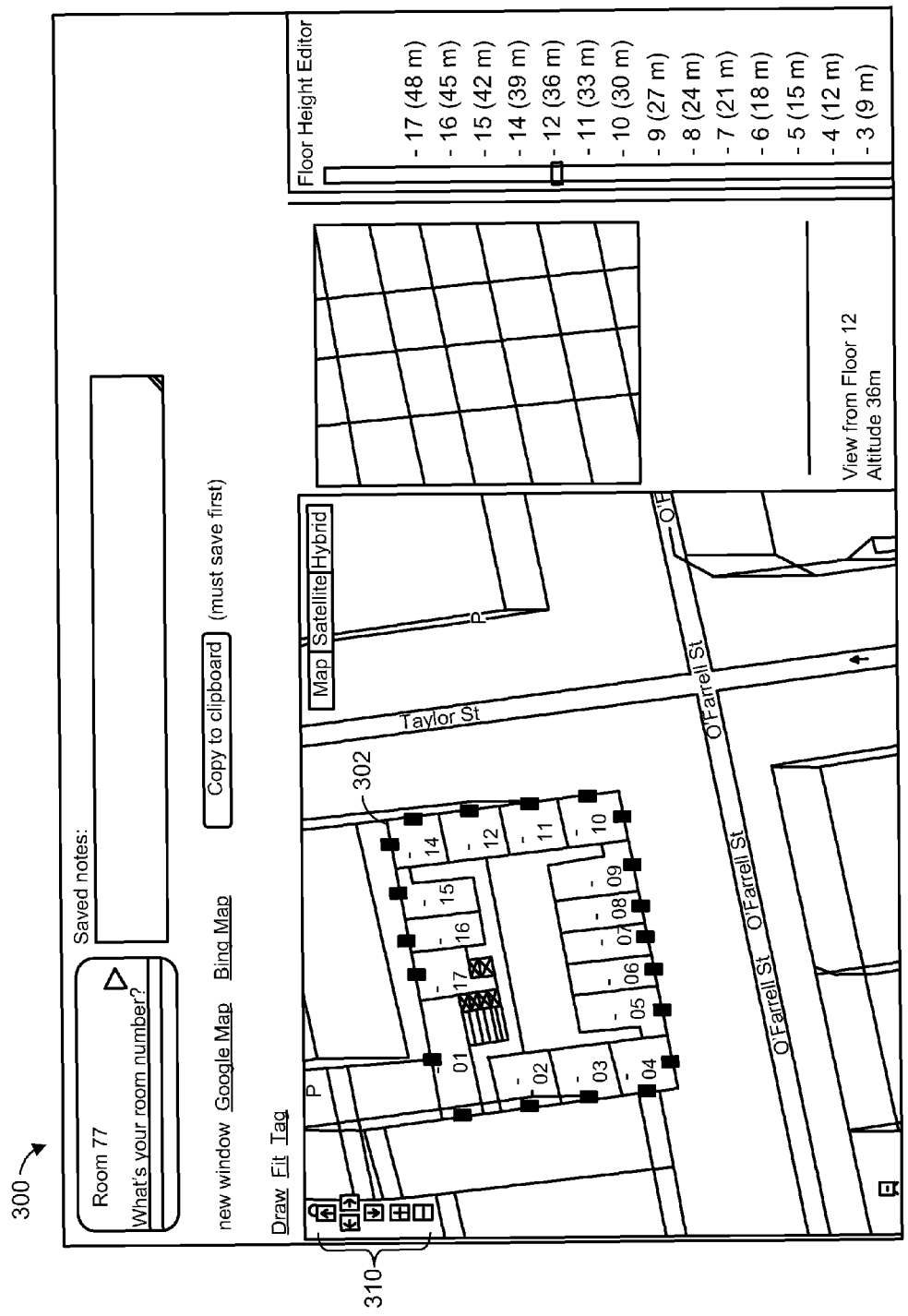
FIG. 3 is a screenshot of a user interface that allows one or more users to provide input that fits the drawn image onto a map, according to an embodiment of the invention.

FIG. 3 is a screenshot of a user interface 300 that allows one or more system users to provide input that fits the drawn image (e.g., generated by drawing component 122) onto a portion of a base image, according to an embodiment of the invention. User interface 300 is a part of fitting component 124 and displays the base image. Base image may be satellite image, an aerial image (e.g., taken from an airplane), a map image, or a hybrid of a map image and a satellite/aerial image.

The base image is associated with a mapping that maps points on the based image with a plurality of spatial coordinates. The plurality of spatial coordinates may be geographical coordinates, such as longitude and latitude. Thus, each point on the base image may be associated with a different set of longitude and latitude coordinates. The granularity of the mapping may vary from one base image to another. The granularity of a mapping refers to the number of points in the mapping relative to the size of the base image. Thus, if a first base image and a second base image are the same size and the first base image has more points in its mapping than the points in the mapping of the second base image, then the mapping of the first base image has a finer granularity than the second base image.

User interface 300 also displays a drawn image 302 that is overlaid on the base image. In this example, drawn image 302 is a rotated and scaled-down version of drawn image 202 depicted in FIG. 2. Drawn image 302 also indicates locations on the exterior walls where windows are located.

User interface 300 includes controls 310 for zooming in on a geographical area indicated by the base image. Zooming in on a geographical area indicated by the base image involves adjusting the scale of the base image, or adjusting the ratio of the size of the display relative to size of the geographical area indicated in the display. For example, before zooming, 1 inch of a screen of the display of the base image equals ¼ of a mile. After zooming, 1 inch of the screen equals 1/16 of a mile.

Controls 310 include controls for moving the base image up, down, left, and right, such that a different portion of the base image is displayed after each such movement.

User interface 300 also includes controls for rotating drawn image 302 either clockwise or counter clockwise. Additionally or alternatively to controls 310, user interface 300 includes image controls for scaling (or adjusting the size of) drawn image 302. Thus, instead of zooming in or out on the map using controls 310, the image scaling controls may be used to "fit" drawn image 302 onto a portion of the base image. In an embodiment, both the base image and drawn image 302 can be rotated and scaled based on input from a system user.

Once a system user is satisfied with the position of drawn image 302 on the base image and the size of drawn image 302 relative to the scale of the base image, the system user may provide input (e.g., selection of a "Done" button) that causes the geographical coordinates of each hotel room indicated in drawn image 302 to be determined and saved.

In one embodiment, in response to activation of the "Done" button, the geographical coordinates of each hotel room are determined based on (a) where the room was fitted to the base image, and (b) the mapping of the base image to geographic coordinates. Fitting component 124 may include a room-to-geographical location mapping component that identifies the geographical location of each corner of each hotel room. These locations can be used to determine the size of the hotel room. The determined hotel room size may be very accurate, especially if the floor plan of a hotel room is a rectangle. However, a hotel room may have a more complicated floor plan, such as a circle or a non-convex shape. Thus, the steps performed to determine a room size may approximate the actual room size.

Additionally or alternatively, the size of one or more of the hotel rooms maybe indicated in the floor plan itself or may be indicated via another source, such as a website that describes the hotel. In these scenarios, a system user might manually input (e.g., during the tagging step described below), into markup tool 120, room size data that indicates a size for each hotel room of one or more hotel rooms.

In a related embodiment, the floor plan image is aligned with a base image before the hotel rooms are drawn instead of after the hotel rooms are drawn. In the end, a mapping is created between hotel room boundaries reflected in the floor plan image and the spatial coordinates.

Tagging Rooms

After drawn image 302 is created, a hotel room indicated in drawn image 302 is "tagged" or labeled with information about the hotel room. The information that is tagged with each hotel room is stored in hotel room database 130. This tagging or labeling step may be performed after or before the fitting step.

Figure 4:
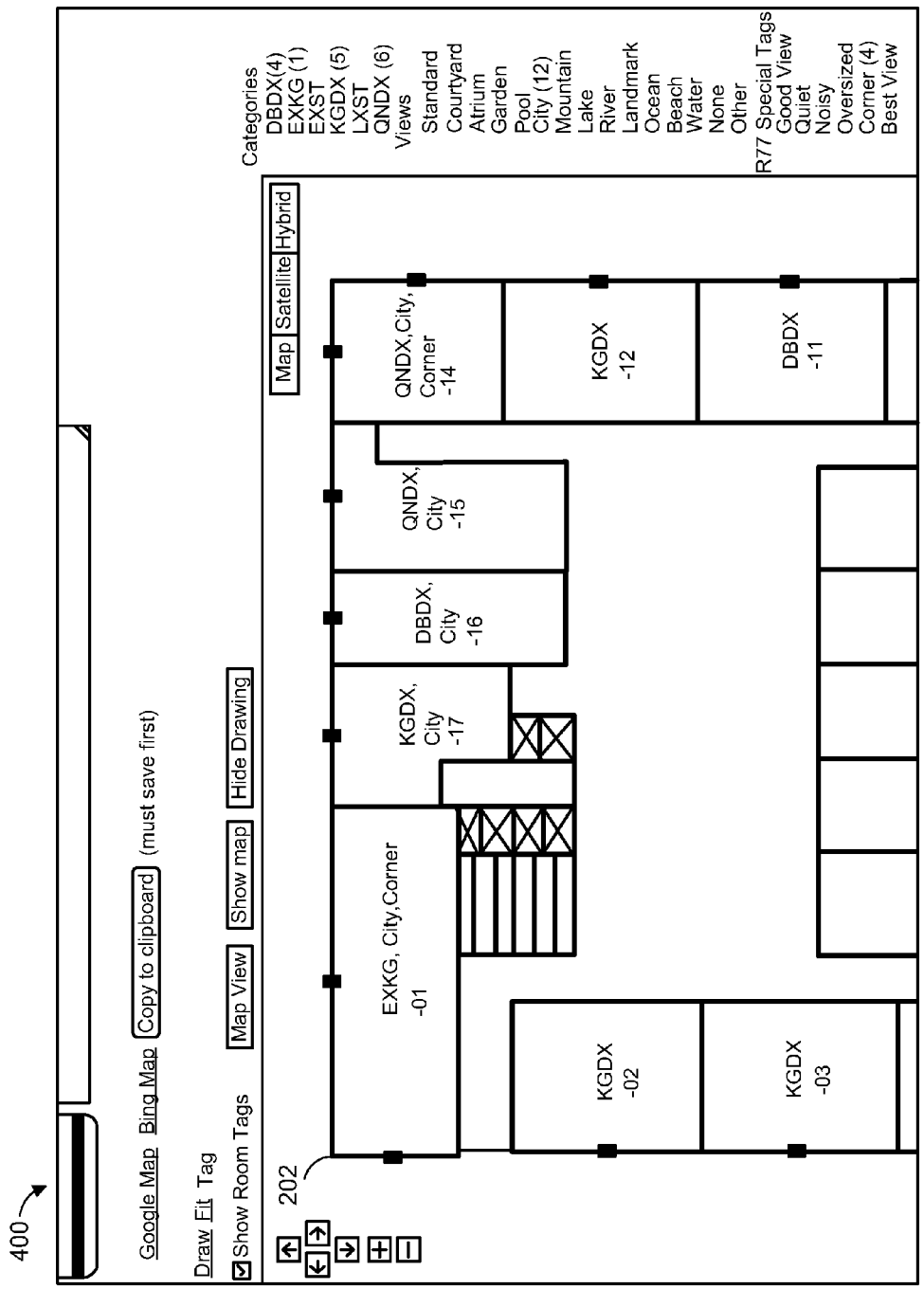
FIG. 4 is a block diagram that illustrates a user interface that allows a user to tag or label each individual habitable unit indicated in a drawn image, according to an embodiment of the invention.

FIG. 4 is a block diagram that illustrates a user interface 400 that allows a system user to tag or label each hotel room indicated in drawn image 302 (or 202), according to an embodiment of the invention. A tag or a label is a value for a particular attribute of a particular hotel room. Thus, the types of tags with which a hotel room may be associated correspond to the types of attributes of a hotel room. Therefore, the following are non-limiting examples of types of tags: room number, room size, number of beds, size of beds, room category, number of rooms (in the hotel room or unit), whether smoking is allowed, whether there is a balcony, distance from elevators, and whether the view is considered "good."

In an embodiment, a mechanism is provided to tag a batch of hotel rooms without requiring a system user to specify the tag for each of the hotel rooms. One situation in which batch tagging is helpful is when many hotel rooms share the same attributes (or attribute values) with other hotel rooms. For example, a particular hotel allows smoking in some hotel rooms but not in others. Therefore, without requiring a system user to individually tag hotel rooms with a no smoking indicator where smoking is not allowed, a system user may identify a set of hotel rooms by manually selecting each hotel room depicted on a display and then selecting a "no smoking" indicator once. This set of inputs causes a no-smoking designation to be associated with each hotel room in the set. The number of inputs in this scenario can be modeled as "n+1" where n equals the number of hotel rooms that are to be associated with the tag.

Alternatively, a system user may tag multiple hotel rooms by entering a single tag rule. A tag rule is the association between a tag and a pattern that may be matched by multiple hotel rooms. After entering a pattern, a system user may then select one or more attribute indicators (e.g., a "no smoking" indicator) once. Conversely, after entering a tag, a system user may enter a pattern. In both scenarios, the tag is associated with the pattern to create a tag rule.

An example of a pattern is a range of hotel room numbers, an example of which is the following: 101-149, 201-249, and 301-349. Another example of a pattern involving a regular expression, an example of which is the following: "*01-*03, *15-*17." This pattern involving a regular expression indicates rooms on each floor that have 01, 02, 03, 15, 16, and 17 as the last two digits of their room number. Thus, a pattern involving a regular expression that indicates a set of hotel rooms may be shorter than a specified range that indicates the same set of hotel rooms.

One way to tag multiple hotel rooms with a single tag rule is to first create data that establishes room categories. Many hotels designate each hotel room as belonging to one room category. Different hotel rooms in a single hotel (e.g., in the same building or complex) belong to different room categories. Non-limiting examples of room categories include "Double Room," "Double Deluxe Room," "King Bay View Room," "King Room," "Penthouse Queen View Room," and "Queen Deluxe Room." Typically, all rooms in a hotel that belong to the same room category will have the same attributes or characteristics, such as size, number of beds, number of rooms, smoking/non-smoking, patio, balcony, and whether pets are allowed. Thus, a system user can define one or more room categories and then select the attributes/characteristics that are shared by all (or most) hotel rooms that belong to a particular room category. After one or more room categories are defined, multiple hotel rooms can be tagged or labeled by associating a single tag with a single room category. In this way, a single pattern is associated with multiple attributes.

To assist a system user in creating and viewing multiple tag rules at once, a user interface (not shown) may be displayed that depicts multiple columns: one that indicates a room category, one that indicates a set of room numbers, and one that indicates a floor range. Each row in the room category column may be implemented as a drop down menu that, when selected, lists a plurality of room categories. The list of room categories may be limited to only those that are available at the hotel in question. In each row under the room number column, a system user can input a pattern (e.g., "*01, *03" or "604, 607"). In each row under the floor range column, a system user can input data that indicates one or more floors, such as a floor range (e.g., "4-7"). Thus, while providing input for one room category, a system user may be able to view hotel room ranges and patterns that are associated with other room categories. This can assist a user in making sure that the same hotel room is not designated (as indicated in different patterns) as belonging to two or more different room categories.

Executing or processing a tag rule causes data that identifies a specific room (e.g., a room number of a particular hotel) with a tag indicated in the tag rule. For example, processing the tag rule "2 Queen: 101-123" causes 23 records to be created where each record indicates "2 Queen" and a different hotel room number from numbers 101-123. If a record is already created for each of the hotel rooms, then "2 Queen" is added to the "Bed Type" field of each record.

Additionally or alternatively, a system user may enter an "exception tag rule" that includes a tag and identifies a pattern that indicates multiple hotel rooms that are not associated with that tag. For example, an exception tag rule might indicate that all hotel rooms in Hotel X are non-smoking except for rooms ending in 17, 19, and 21. Processing this exception tag rule generates data that associates, for example, (1) room 101 with a no smoking attribute value and (2) room 117 with a smoking attribute value.

As noted previously, a building may include multiple floors where the floor plan of one floor in the building is identical to the floor plan of one or more other floors in the building. With this knowledge, a drawn image (e.g., drawn image 302) does not have to be generated for each floor of the corresponding hotel. Instead, each hotel room depicted in drawn image is presumed to have the same spatial or geographic coordinates and same characteristics (e.g., room size, room category) as the corresponding hotel room on another floor. Also, typically, the room number of a hotel room on one floor has the same suffix as the corresponding hotel room on another floor.

For example, a hotel room with room number 101 corresponds to the hotel room with room number 201, which (if there is an additional floor) corresponds to the hotel room with room number 301. Thus, the set of tags that are associated with hotel room #101 are automatically associated with hotel room #201, #301, and so forth. This automatic association may be based on one or more regular expressions, mentioned previously.

In a related embodiment, each hotel room in a particular hotel may be categorized as belonging to one of multiple room categories, such as the "King" category, the "Presidential" category, and the "Deluxe" category. The names of the various room categories may correspond to names established by the hotel (or rather representatives thereof) or may be selected or chosen by a system user of markup tool 120. Each category is associated with the same set of attribute values (such as "400 ft$^2$" for room size, "2" for number of beds, and "King and Queen" for types of beds), but not necessarily all possible attributes. For example, many hotel rooms from the same category may be varying distances from the nearest elevator and/or stairs. If a hotel room is associated with a particular room category and the particular room category is associated with a particular set of attribute values, then the hotel room (and each other hotel room that is associated with the particular room category) "inherits" that particular set of attribute values. In other words, at least some of attribute values of the hotel room may be identified by first determining the category of the hotel room and then identifying the attribute values associated with that category.

Auto-Correcting Tags

Because some of the process of tagging hotel rooms reflected in drawn image 302 may entail significant user input (such as assigning room numbers or creating rules), some errors may occur. Some errors may be difficult to manually discover, especially if rules, such as rules whose patterns are regular expressions, are used to associate an attribute value with a large number of hotel rooms. One example of an error is multiple hotel rooms in the same hotel having the same room number. Contradicting data is another type of error. For example, first data stored in hotel room database 130 may indicate that no smoking is allowed in a particular hotel room while second data stored in hotel room database 130 may indicate that smoking is allowed in the particular hotel room.

Therefore, in an embodiment, after a set of hotel rooms of a particular hotel are tagged, markup tool 120 (or another process) analyzes the rules to discover any errors. Such analyzing may involve generating (at least temporarily) a plurality of records, each of which stores attribute values for each hotel room. If an auto-correcting process attempts to input, into a record, an attribute value (for a particular attribute) that contradicts another attribute value (for the same particular attribute) that is already stored in the record, then an action is performed. The action may involve generating an alert that is provided to a system user of markup tool 120 or other system 100 generally.

View from a Hotel Room

In an embodiment, hotel room database 130 stores, for each one or more hotel rooms, visual information that represents a view from the hotel room. Non-limiting examples of visual information items include a computer-rendered image, an actual digital photo taken by a digital camera, and video.

In an embodiment, multiple images of views from a hotel room may be associated with a particular hotel room in hotel room database 130. For example, for a single hotel room, there may be an image of a particular view looking straight out from a window (i.e., perpendicular to the width of the window) of the hotel room, an image looking 45° to the right of the particular view, an image looking 45° to the left of the particular view, and an image looking 30° down from the particular view (e.g., if the hotel room is on a high floor).

As noted above, an image that is associated with a particular hotel room and stored in hotel room database 130 may be an actual image that is created by a camera operated by a user that is located in the hotel room. The user then causes the image to be sent over a network to a storage device that another user (e.g., a user of system 100) with access to hotel room database 130 has access. The image may be sent with data that indicates from which particular hotel room the image was taken. The other user then causes the image to be stored, in hotel room database 130, in association with the particular hotel room.

In an embodiment, one or more images that represent views from a hotel room may be computer-rendered images that are automatically generated based on the geographical location of a window of the hotel room and the orientation of the window. Drawn image 302 may include a window object that represents a window in a hotel room. Once drawn image 302 is "fitted" onto a portion of a base (e.g., satellite or map) image, the geographic location of the window object can then be determined, e.g., based on the correlation of the drawn image to the base image, and the mapping of the real-world geographic coordinates to the base image. This geographical location is used as input into an image rendering service. In order to generate an accurate image of a view from a hotel room, the orientation of the view is also identified. The orientation of the view may be determined in a number of ways. For example, the orientation corresponds to the direction of a line that is perpendicular to the width of the window and that points away from the inside of the hotel room.

In addition to geographical coordinates and orientation, another value that may be used to generate a computer-rendered image is altitude, elevation, or height from the ground. Without altitude, a computer-rendered image may be based on the assumption that the view is from ground level or from, for example, 20 feet high. However, a view from a hotel room that is on the $10^{th}$ floor of a hotel may be very different than a view from a hotel room that is on the $1^{st}$ floor of the same hotel, even if both hotel rooms have the same longitude and latitude coordinates. The altitude or elevation of a view from a hotel room may be determined based on the height of each floor of the hotel, the floor on which the hotel room resides, and a known elevation of a base of the hotel. For example, if a particular hotel room is on the $6^{th}$ floor of a hotel building and hotel floors are generally 10 feet in height and the center of windows are generally 5 feet above the floor of a hotel room, then the height off the ground of the particular hotel room is approximately 55 feet (assuming that the $1^{st}$ floor is the ground floor of the hotel building).

In an embodiment, a third-party service may be used to obtain visual information (e.g. images or video) based on the location (e.g. longitude, latitude, altitude) of a window in a hotel room and, optionally, the angle at which an occupant would likely look out the window. Markup tool 120 or another computing entity associated with system 100 sends geographical location data (e.g., latitude and longitude coordinates) and orientation data (that indicates, e.g., S, NW, or NNE) to the third-party rendering service. The third-party rendering service generates, based on the input, a computer-rendered image (preferably based on a combination of satellite imagery, ground-level photos, aerial photos, 3D modeling of buildings, and digital terrain data), and sends the computer-rendered image to markup tool 120 (or another computing device of system 100 not shown).

In a related embodiment, a public or private database of stored images (and/or video) is accessed to identify images that were created at geographical locations. An example of such a public database of images is provided by Flickr™. Many images today are created by cameras that have geo-location capabilities that enable an image to be associated with a specific geographical location. The geographical location may be based on longitude and latitude coordinates. If an image in a public database is associated with geographical coordinates that exactly or nearly match geographical coordinates associated with a hotel room, then that image may be a candidate to store in association with the hotel room. Thus, a public or private database of images may be searched for images that are associated with specific geographic locations that correspond to geographical locations of hotel rooms to identify a set of candidate images. A system user may view each candidate image in the set to determine whether the image is or might be an accurate depiction of a view from the corresponding hotel room. If so, then the image is associated with the corresponding hotel room. If not, then the image is discarded.

An image might not contain an accurate depiction of a view from a hotel room because the orientation may be incorrect (e.g., the image is a view of the hotel room instead of a view from the hotel room). Also, the geographical location associated with an image may not be accurate. For example, a camera that created the image may not have accurate geo-location components, which may cause any images created by that camera to be a few feet or meters off.

Images that are from a publicly-accessible database and that are of a view from a hotel room may be used to supplement, in hotel room database 130, any computer-rendered images associated with that hotel room.

Implementing a Hotel Room Database

In an embodiment, hotel room database 130 stores a separate record, row, or object for each hotel room for which information is known. A table (or relation) may be created for each hotel and the columns of the table correspond to attributes or characteristics of the hotel rooms of the hotel, such as room number, room category, number of beds, room size, floor number, etc. The attribute values stored in the columns may have been based on user input received during the labeling step described previously. Some of the attribute values may be determined automatically. Non-limiting examples of attributes for which values may be automatically-determined include, distance from elevators, distance from stairs, distance from vending machines, room size (e.g., determined based on the geographical coordinates of the room's boundaries), and one or more views from the hotel room.

Storing a separate set of attribute values of a hotel room for each hotel room reflected in hotel room database 130 may cause the size of hotel room database 130 to be unnecessarily large. Many hotel rooms from the same hotel have the same attribute values. For example, all hotel rooms that end in one of 01 to 23 in a hotel may be of the same size, e.g., square footage. As another example, all hotel rooms that end in 04 in a hotel may be 10 feet from an elevator. Therefore, in an embodiment, hotel room database 130 stores a plurality of tag rules that reflect information about a plurality of hotel rooms. As described previously, each tag rule associates one or more attribute values with a pattern that identifies a plurality of specific hotel rooms. A single tag rule may reflect information about multiple hotel rooms in a single hotel or in multiple hotels. For example, a particular hotel chain might own multiple buildings at different cities where each building has the same floor plan. Thus, the hotel rooms on floor 2 of a hotel at one location (e.g., in one city) may have the same attribute values as the hotel rooms on floor 2 of a hotel at another location (e.g., in a different city).

In an embodiment, hotel room database 130 includes non-volatile memory that stores a plurality of tag rules. Later, one or more processes (not shown) analyze the plurality of tag rules, generate a row (or record) for each hotel room reflected in the plurality of tag rules, and store each row in volatile memory (not shown). The records may be generated when a system that receives and processes search queries against hotel room database 130 starts up. In this way, for each search query, information about each hotel room may be quickly accessed (in volatile memory) without having to process any of the plurality of tag rules in response to receiving the search query.

Room Category Mapping

Additional information about hotel room categories may be retrieved from multiple sources. A non-limiting example of such information is pricing information, which may change relatively frequently. Non-limiting examples of sources from which pricing information may be retrieved include a representative or website of the hotel itself and third-party sources, such as Travelocity, Orbitz, and Expedia. Third-party sources typically identify room categories of a particular hotel using identifiers that are different than the identifiers used by the particular hotel itself. For example, a particular hotel might have a hotel room category that is designates 2QD, which stands for "2 Queen beds, Deluxe room." A third-party source might refer to the same hotel room category from that particular hotel as "Deluxe Queen Room."

Thus, when retrieving, from a third-party source, pricing information about a hotel, the identifiers used by the third-party source eventually need to be matched to the identifiers used by the hotel. Therefore, in an embodiment, hotel room database 130 (or an associated storage device) stores, for a particular hotel, mapping information that maps a room category identifier (used by a third-party source) to another room category identifier (used by the particular hotel). Hotel room database 130 already stores data that associates (e.g., using a tag rule) one or more hotel rooms with a particular room category used by the hotel to which the one or more hotel rooms belong. The particular room category may be initially identified, for example, in a floor plan image from the hotel or on a website of the hotel. For the particular room category, one or more room category identifiers are retrieved from one or more third-party sources. A system user might manually create a mapping between the identifier used by the hotel and the one or more room category identifiers.

When updating hotel room database 130 to store, for example, pricing information in association with multiple hotel rooms of a particular hotel, pricing data is retrieved from a third-party source, the appropriate room category mapping (i.e., associated with the particular hotel) is identified, and the corresponding room category identifier is identified. The hotel room database 130 is then updated to store the pricing information in association with all the hotel rooms (of the particular hotel) that are associated with the corresponding room category identifier.

Modifying Data in Hotel Room Database

Even after a floor plan is drawn, fitted, and tagged, there may be information missing for one or more hotel rooms in hotel room database 130. For example, a floor plan image may not include any indication about whether smoking is allowed in certain rooms or where a hotel lobby is located relative to each hotel room. Furthermore, some of the information reflected in a floor plan image may be incorrect. For example, house keeping services may have been relocated or room numbers reflected in a floor plan image may be incorrect. Therefore, in an embodiment, an update tool is provided for a system user to update information about a specific hotel room or multiple hotel rooms. For example, the update tool may be used to modify a tag rule. Thus, the update tool has access to hotel room database 130. The update tool (not shown) may be part of markup tool 120 or may be a separate tool altogether.

User Reviews

In an embodiment, a user review tool is provided that allows reviews from users (or hotel patrons) to be stored in hotel room database 130 in association with the appropriate rooms. The user review tool may be part of system 100. The user review tool accepts reviews from users, which reviews may be submitted by email, text (SMS) message, web page input, or a dedicated application executing on users' devices, such as smart phones. These user reviews can be helpful for other users (i.e., end-users) who submit search queries that are processed against hotel room database 130. Thus, even if a particular hotel room is considered a good match for a particular end-user, a poor review of that specific room from another user may persuade the particular end-user to consider, or at least view information about, other hotel rooms. Conversely, a good review of a specific hotel room might persuade an end-user to reserve that room even though the hotel room was not considered the best match for the particular end-user.

Overview of Searching Across Hotel Rooms

According to an embodiment, a search query that targets information about individual habitable units (e.g., hotel rooms) is processed and that information is identified and returned to an end-user, such as the end-user that formulated the search query. The information identifies individual hotel rooms (e.g., by room number) and includes attribute values about the individual hotel rooms (e.g., number of beds, room size). In contrast, previously, only information about hotels generally was typically returned in response to search queries about hotels. In other words, there was usually no notion of providing, to end-users, information about individual hotel rooms.

System Overview

Figure 5:
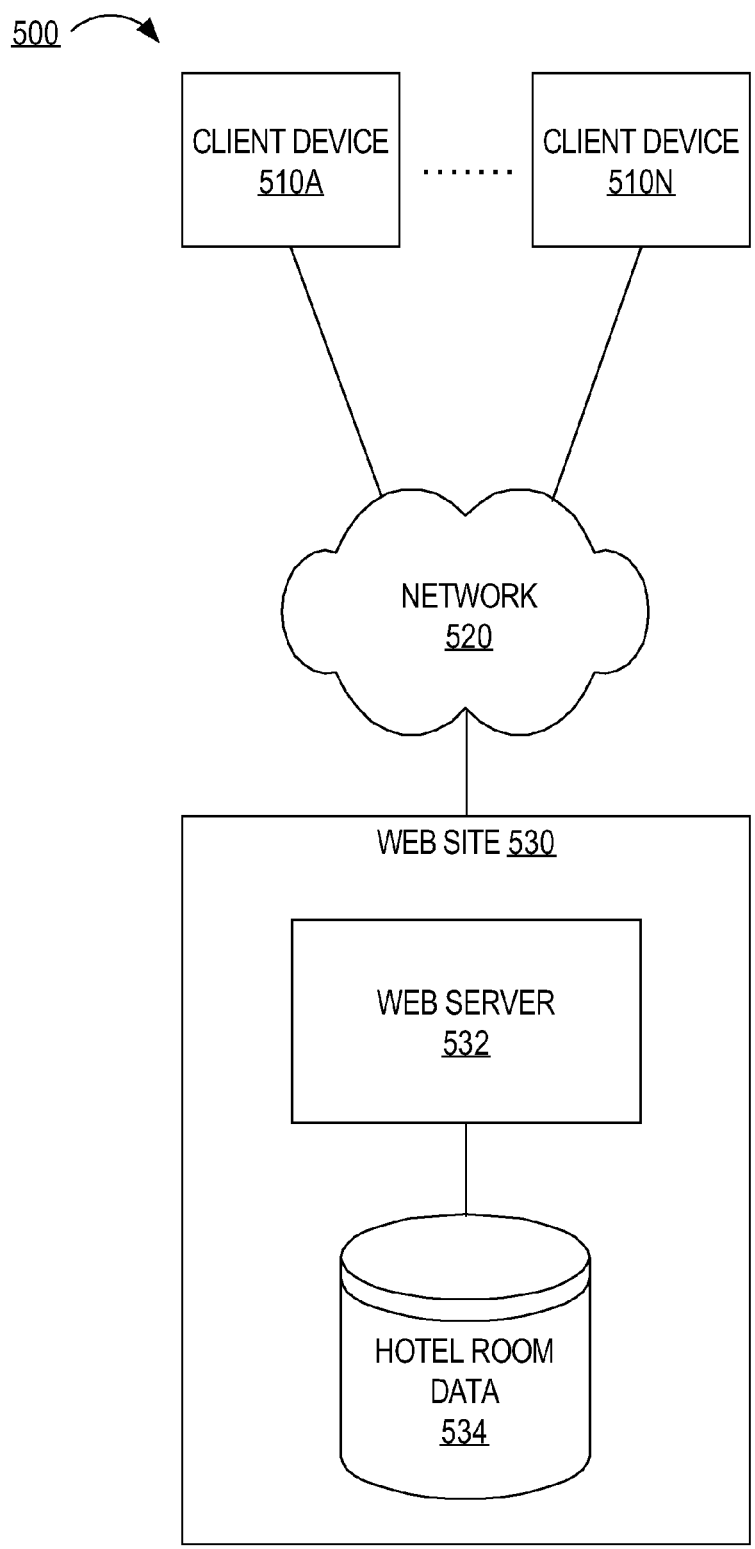
FIG. 5 is a block diagram that depicts a system for processing search queries against a individual habitable unit database, according to an embodiment of the invention.

FIG. 5 is a block diagram that depicts a system 500 for processing search queries against hotel room database 130, according to an embodiment of the invention. System 500 includes client devices 510A-N, a network 520, and a web site 530. Web site 530 includes web server 532 and a hotel room data 534. Although only two client devices are depicted in FIG. 5, more client devices may submit search queries to web site 530. Further, although only a single web server 532, web site 530 may include multiple web servers 532 that have access to hotel room data 534 and that can process search queries on behalf of web site 530.

Each client device of client devices 510A-N is capable of receiving input from an end-user and sending a search query over network 520 to web server 532. The input from an end-user may be voice input or text input. An application executing on each of client devices 510A-N (e.g., a web browser or an application created by the entity that hosts web server 532) accepts the input and formulates a search query that web server 532 is capable of processing. Non-limiting examples of client devices 510A-N include a desktop computer, a laptop computer, a tablet computer, and a smart phone.

Web server 532 processes search queries received from client devices 510A-N. For each search query, web server 532 identifies one or more hotel rooms that satisfy criteria associated with the search query and sends data that identifies the one or more hotel rooms to the client device that issued the search query.

As indicated above, web server 532 accesses hotel room data 534 in response to a search query. Hotel room data 534 may be stored in volatile or non-volatile memory. For example, hotel room data 534 may be the same data that is reflected in hotel room database 130. As another example, hotel room database 130 may be a non-volatile storage device while hotel room data 534 may be stored in volatile memory and may be generated from tag or label data stored in hotel room database 130.

Client devices 510A-N and web server 532 are able to communicate over network 520. Embodiments of the invention are not limited to the particular communication protocol that is used to transfer data and messages between client devices 510A-N and web server 532. A non-limiting example of a communication protocol that may be employed by the entities depicted in FIG. 1 is Hypertext Transfer Protocol (HTTP).

Communication between client devices 510A-N and web server 532 is made possible via network 520. Network 520 may be implemented by any medium or mechanism that provides for the exchange of data between various computing devices. Examples of such a network include, without limitation, a network such as a Local Area Network (LAN), Wide Area Network (WAN), Ethernet or the Internet, or one or more terrestrial, satellite, or wireless links. The network may include a combination of networks such as those described. The network may transmit data according to Transmission Control Protocol (TCP), User Datagram Protocol (UDP), and/or Internet Protocol (IP).

Search Criteria

A search query (issued by one of client devices 510A-N) may be associated with one or more search criteria that limit the information about individual hotel rooms that is returned in response to the search query. Each search criterion corresponds to an attribute of a hotel room reflected in hotel room data 534. Non-limiting examples of search criteria include:
location data (e.g., state, city, zip code, "the strip") that indicates a location of a hotel room;
name data that indicates a name of a hotel (or multiple names of multiple hotels);
price data that indicates a threshold value (e.g., <$250) or range of prices (e.g., $100-$220) that the end-user is willing to pay;
floor data that indicates one or more floors on which a hotel room should reside (e.g., <floor 3) or a relative floor level (e.g., "low" or "high");
view data that indicates whether the view from a hotel room is important and/or whether an actual photo (i.e., not computer-rendered) of a view from a hotel room is available;
elevator data that indicates whether the closeness of an elevator to a hotel room is important;
connecting room data that indicates whether a connecting room to a hotel room is important;
room size data that indicates a size (e.g., 7 300 ft$^2$) or a range of sizes ("400-600 square feet") of a hotel room;
room category data that indicates a category with which a hotel room is associated;
bed data that indicates a number of beds and/or a size of bed(s) (e.g., king, queen, double) in a hotel room;
smoking data that indicates whether smoking is allowed in a hotel room;
balcony data that indicates whether a hotel room has a balcony; and
distance data that indicates a distance from a hotel room to an object within (or on the same property as) the hotel in which the hotel room is located, such as an elevator, stairs, a vending machine, a swimming pool, hotel housekeeping, a hotel lobby, and a noise source; and
distance data that indicates a distance from a hotel room to an object outside of (or on different property) the hotel in which the hotel room is located, such as a restaurant, a nightclub, the downtown of the city in which the hotel is located, and a noise source.

Non-limiting examples of a noise source include a popular night club, road construction, and a noisy factory.

A search query that is sent by a client device (e.g., client device 510A) may specify one or more search criteria. Such search criteria may include one or more criteria that were selected by an end-user that initiated the search query. Such search criteria are referred to herein as "user-specified search criteria."

Additionally, search criteria of a search query may include one or more criteria that were not selected by an end-user that initiated the search query. Such search criteria are referred to herein as "default criteria." For example, assume that an end-user has specified (a) a city, and (b) a specific hotel, without specifying any other search criteria. Even though the end-user did not specify other criteria, the web page displayed on client device 510A may indicate one or more criteria that have been "pre-selected". For example, even though the end-user did not specify any criteria relating to room view, the web page may indicate that room view quality is "important". Similarly, in the absence of any user-specified search criteria on the subject, the default criteria may indicate that the end-user's preference for floor is "high," for elevator is "far," and for connecting room is "unimportant."

As another example, a search query may specify the name of a city and default criterion may be that a view from a hotel room is important. Thus, in response to receiving the search query, web server 532 identifies and returns information about hotel rooms (1) that are located in that city and (2) that are associated with views that are considered "good." Thus, information about hotel rooms that have views that are not considered "good" are not part of the information that is returned in response to the search query.

Default Criteria

There are a variety of ways with which the system my select default criteria, to use in combination with the user-specified criteria, when performing a search for a hotel room. For example, the default criteria may be selected based on a specified criterion-to-default criterion mapping, and/or a user characteristic-to-default criterion mapping, both of which are described in more detail as follows.

With respect to a specified criterion-to-default criterion mapping, one or more criteria specified in a search query are associated with one or more default criteria. In other words, if criteria X is mapped to criteria Y, then criteria Y is added to all searches in which the end-user specified criteria X. Web server 532 accesses such a specified criterion-to-default criterion mapping in response to receiving the search query. Such a mapping may be helpful if it is known that when search queries specify one or more particular criteria, end-users that submit those search queries are generally interested in hotel rooms that are associated with one or more other criteria.

For example, if a search query specifies Las Vegas, Nev. and a criterion-to-criterion mapping associates Las Vegas, Nev. with a high view quality, then web server 532 identifies hotel rooms with views that are considered "good" and, for example, ranks those hotel rooms higher relative to hotel rooms that do not have high view quality.

As another example, a search query specifies smoking, indicating that an end-user that submitted the search query will only consider hotel rooms that allow smoking. In response to receiving the search query, web server 532 identifies a criterion-to-criterion mapping that associates smoking with balcony. Thus, web server 532 identifies hotel rooms that not only allow smoking but that also have balconies.

With respect to a user characteristic-to-default criterion mapping, one or more characteristics or attributes of an end-user are associated with one or more default criteria. That is, if characteristic X is mapped to criteria Y, then criteria Y is added to searches performed by end-users that have characteristic X. Web server 532 accesses such a user characteristic-to-default criterion mapping in response to identifying information about the end-user that initiated the search query. Such a mapping may be helpful if it is known that when end-users with particular characteristics submit search queries, those end-users are typically interested in hotel rooms that are associated with one or more criteria.

Web server 532 may determine a user characteristic in one or more ways. For example, an end-user may be registered with an entity that operates web server 532 and manages hotel room data 534. Prior to receiving a search query from the end-user, the end-user is "signed in." Thus, each search query initiated by the end-user when the end-user is signed in includes identification data that identifies the end-user. The identification data may be associated with one or more default criteria. For example, an end-user may have selected one or more search criteria preferences (e.g. non-smoking) when the end-user initially registered with the service. Then, for the particular search query and subsequent search queries, web server 532 uses the one or more search criteria to identify hotel rooms for that particular end-user even though the particular and subsequent search queries do not specify the one or more search criteria.

The identification data that identifies the end-user may be associated with characteristic data that indicates one or more characteristics of the end-user. The characteristic data, in turn, may be associated with one or more default search criteria. For example, the identification data may be associated with age information, the age information may indicate that the end-user is over 80 years old, and being over 80 years old may cause "easy accessibility" to be selected as a search criterion.

Non-limiting examples of characteristic data include geographic location of the client device that submitted the search query, time of day in which the client device submitted the search query, type of client device (e.g., laptop, desktop, tablet, or smart phone), and a particular group with which the end-user belongs (e.g., a group of frequent travelers). Geographic location, time of day, and type of client device are examples of characteristics that can be determined without an end-user signing in or being registered with web server 532 at all. Each characteristic may be associated with one or more default criteria. For example, identification data associated with a particular end-user that submits a search query (whether or not the particular end-user is registered or signed in) includes an IP address, which is associated with a particular geographic location (i.e., a characteristic), such as Germany. Because it is known that people from Germany generally prefer balconies, web server 532 identifies, based on a characteristic-to-criterion mapping, only hotel rooms that have balconies or at least ranks hotel rooms that have balconies higher than hotel rooms that do not have balconies.

Search Results

Search results that are generated by web server 532 and displayed by a client device (e.g., client device 510A) include information about one or more specific hotel rooms. Each search result in a set of search results may correspond to a different hotel room. Each search result identifies a specific hotel room by, for example, room number. Each search result includes information about one or more attributes of the corresponding hotel room, such as room size, room price, room category, number of beds, size of bed(s), floor number, whether smoking is allowed, whether there is a balcony, distance to elevators, distance to stairs, etc. Further, each search result in a set of search results is not required to contain the same amount or types of information about a corresponding hotel room as each other search result in the set of search results.

Figure 6A:
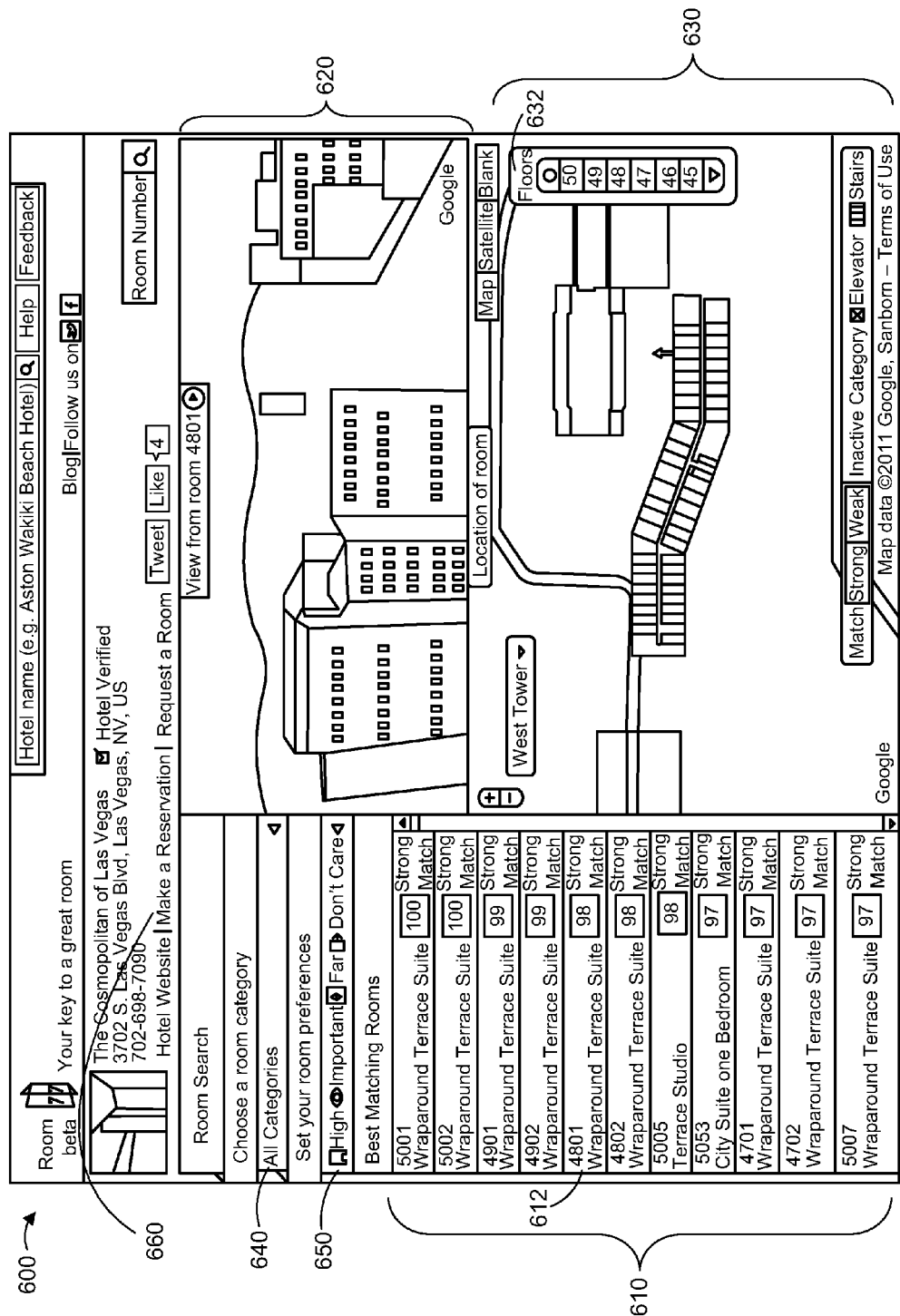
FIGS. 6A-6D depict example search results that are generated in response to search queries against a individual habitable unit database, according to an embodiment of the invention.

FIGS. 6A-6D are example web pages that depict a set of search results 610 based on a search query that specifies a particular hotel that is located in a particular city, according to an embodiment. In FIG. 6A, web page 600 also includes an image 620 (e.g., computer-rendered or an actual digital photo) of a view from a particular hotel room in the specified hotel. Image 620 may change periodically, e.g., every 3 seconds, to display an image of a view from another hotel room in the particular hotel. Web page 600 also includes an aerial view 630 of a floor plan of the particular hotel. An end-user may select a hotel room depicted in aerial view 630, which may cause an image of a view from the selected hotel room to be displayed. In this example, the particular hotel has multiple floors. To enable an end-user to view information about rooms from different floors, aerial view 630 includes a floor selector 632 that allows the end-user select a specific floor in the particular hotel.

In an embodiment, a set of search results that are identified based on a single search query includes information about hotel rooms from different hotels (e.g., different hotel chains or different hotels of the same hotel chain), then each search result may include information that identifies the hotel from which the corresponding hotel room belongs. Alternatively, search results that correspond to hotel rooms from the same hotel may be grouped together where hotel data that indicates the name of each hotel reflected in the search results is only displayed once.

As indicated above, one or more search results are associated with room views. A hotel room view may be computer-rendered or may be an image created by a user's camera, as described previously. Each of one or more search results may have a link (e.g., titled "See View") that, when selected by an end-user, causes an image of a view from the corresponding hotel room to be displayed. Additionally, when the set of search results are displayed to an end-user in response to a search query formulated by the end-user, at least one image of a view from a particular hotel room is displayed. The particular hotel room may correspond to the search result that is at the "top" of the search result list (or the search result that has the highest rank). For example, image 620 may be an image of a view from the hotel room that is considered the best match in search results 610.

Figure 6B:
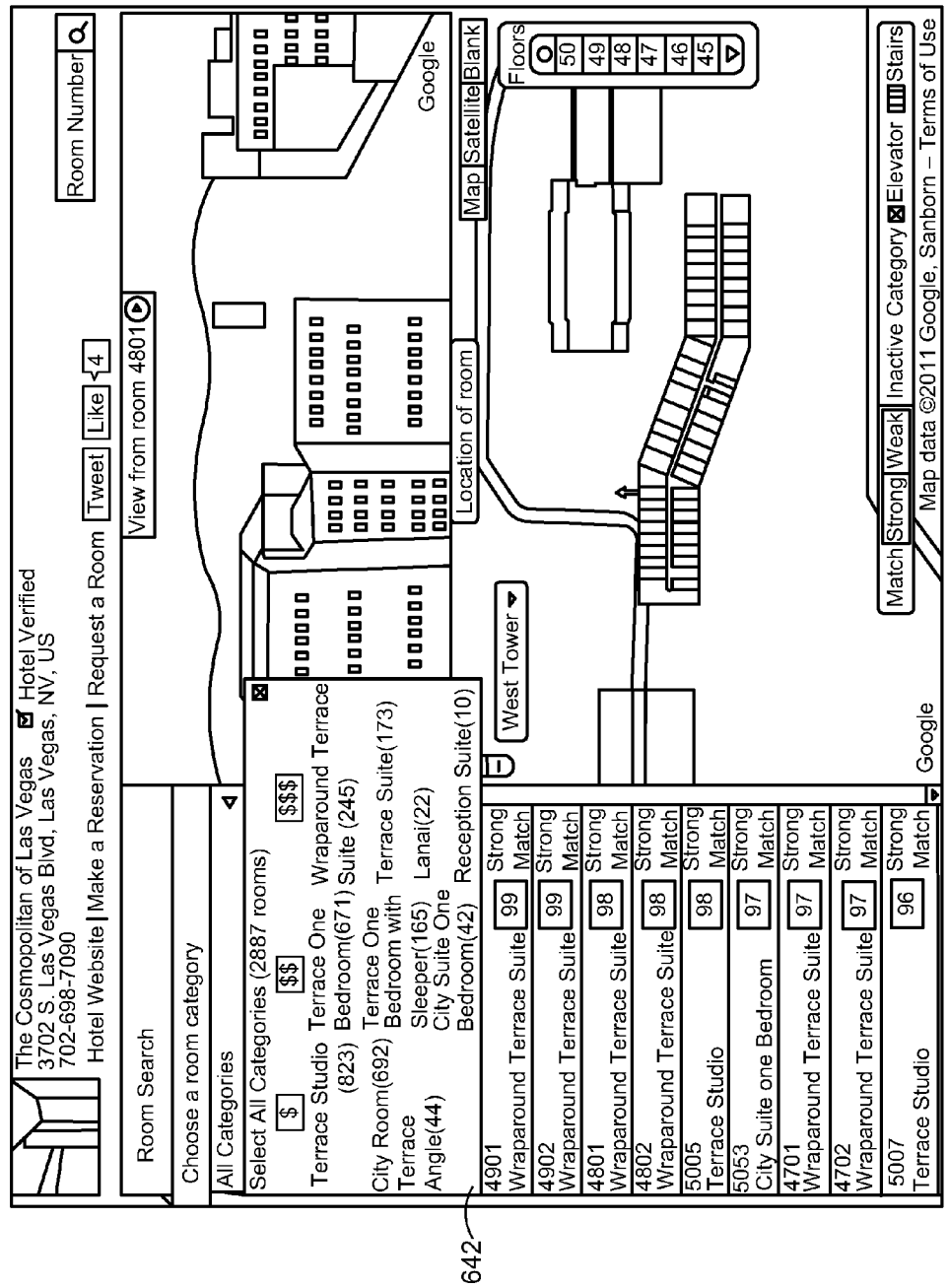

In an embodiment, a search results page that includes the set of search results includes room category options. Because any particular hotel categorizes its hotel rooms differently than other hotels, the room category options change depending on which hotel rooms are reflected in the search results. For example, if the hotel rooms reflected in a set of search results are from Hotel A, then the room category options that are displayed along with the set of search results are based on Hotel A and determined, for example, by web server 532 (or an associated process). The room categories may be based on room prices in Hotel A, number and size of beds in hotel rooms of Hotel A, and/or whether a hotel room in Hotel A has a balcony. Also, one or more of the room categories for Hotel A may have names that are only meaningful to Hotel A, such as the "Parlor Suite," the "Executive Room," and the "Presidential Suite." If a second search query specifies Hotel B, then the room category options that are displayed to an end-user that submitted the second search query are updated to reflect the categories associated with hotel rooms located in Hotel B. Alternatively, Web page 600 includes room category option 640. As indicated in FIG. 6B, selection of room category option 640 causes room category selection window 642 to be displayed. Window 642 depicts ten room categories that are organized into three price categories, indicated by "$."

In an embodiment, a search results page that includes a set of search results generated based on a search query includes preference options. The preference options correspond to one or more search criteria that can be changed after the set of search results are displayed to an end-user.

Figure 6C:
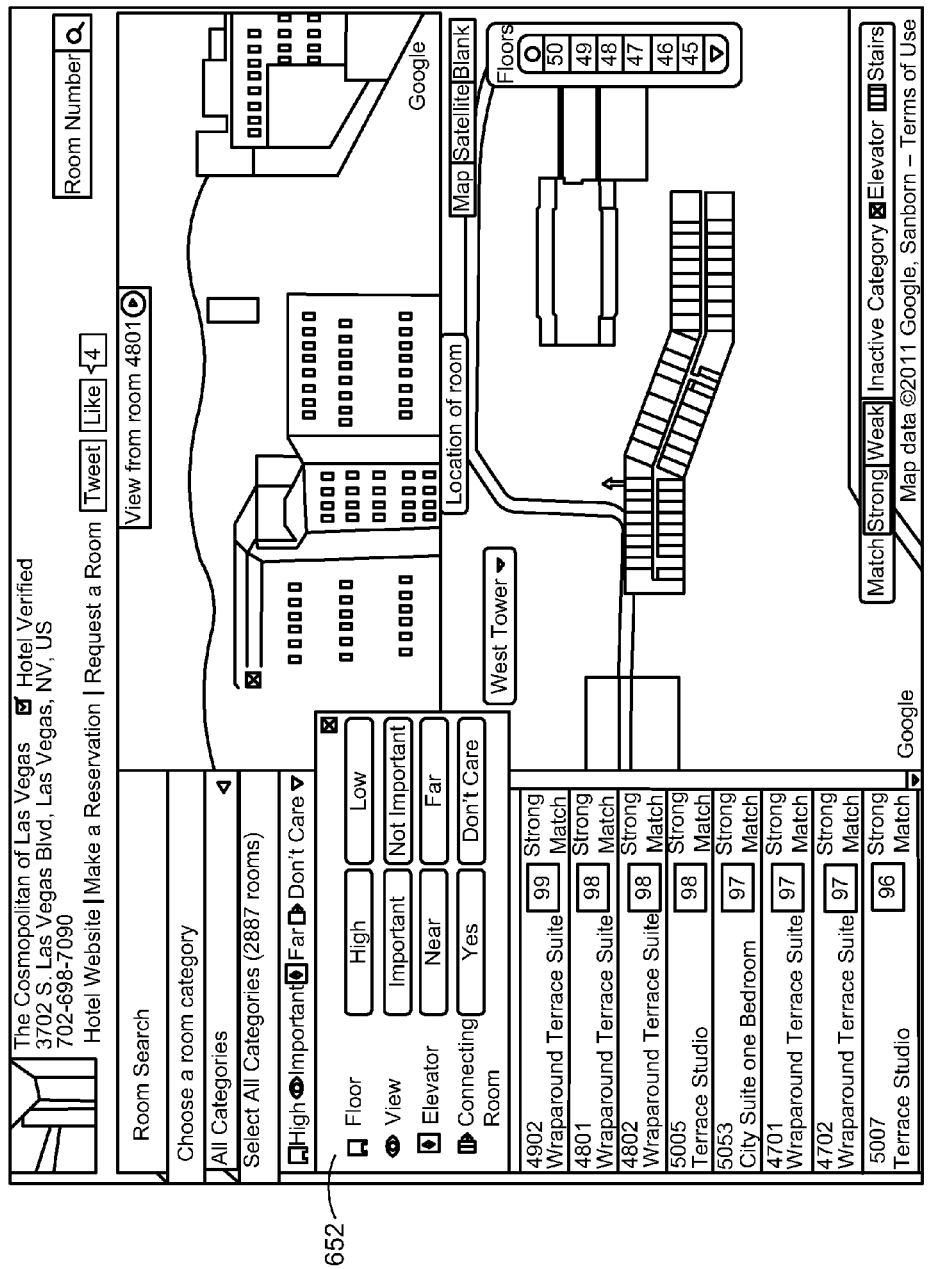

Web page 600 includes room preferences option 650. As indicated in FIG. 6C, selection of room preferences option 650 causes room preferences selection window 652 to be displayed. Window 652 depicts four hotel room attributes that may be selected: Floor, View, Elevator, and Connecting Room. The default attribute values are, respectively, High, Important, Far, and Don't Care. After search results 610 are displayed, if an end-user selects one or more different attribute values (e.g., 'Near' for the distance from elevator attribute), then a different set of search results are displayed, or at least search results 610 may be reordered (e.g., based on an updated ranking).

Figure 6D:
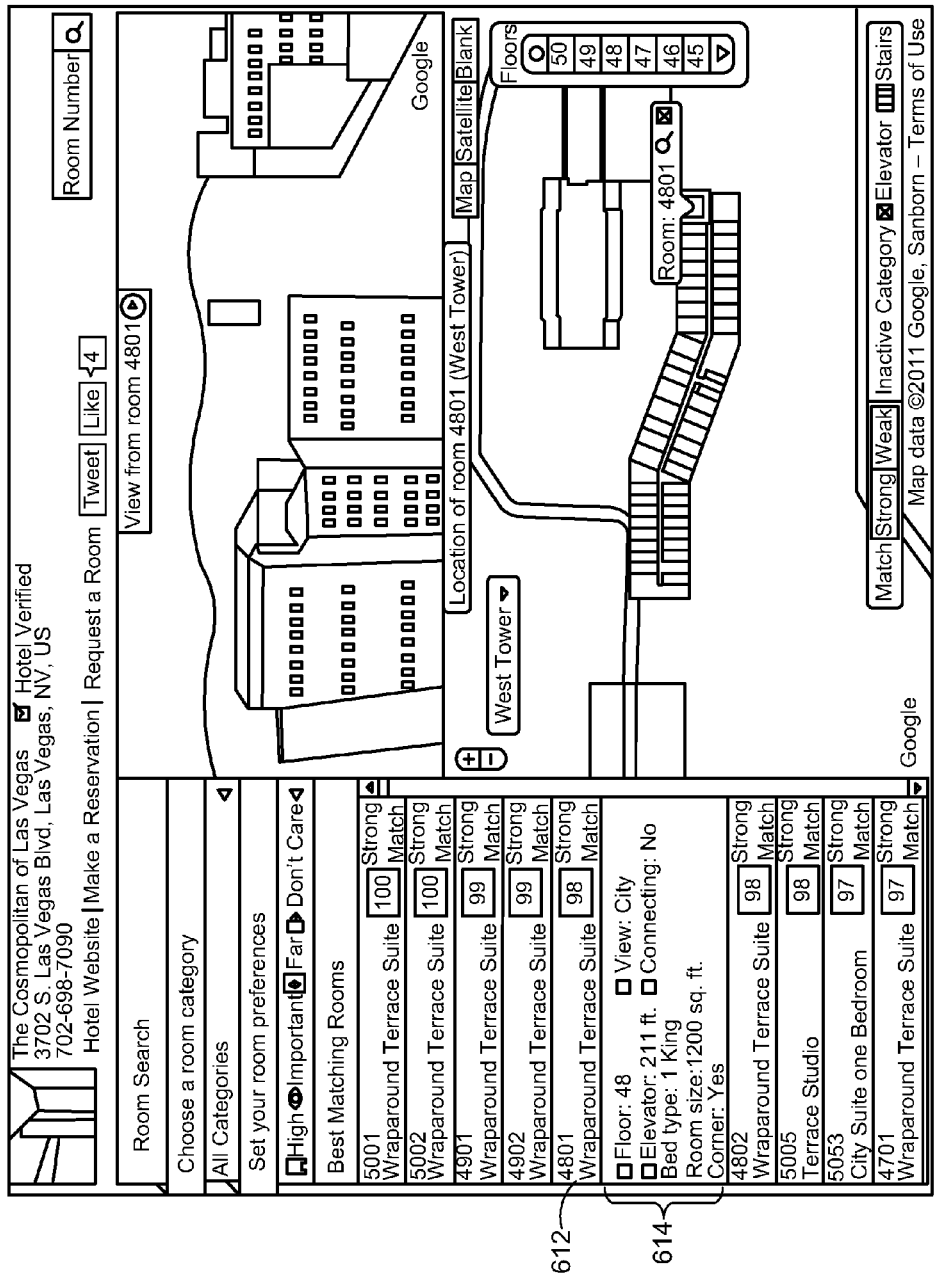

User selection of a search result may cause additional information about the hotel room that corresponds to the search result to be displayed. For example, as indicated in FIG. 6D, selection of search result 612 causes additional hotel data 614 to be displayed, which includes a floor number, a distance from the nearest elevator, whether it is a corner hotel room, whether it has a connecting room, room size, a description of the view, and bed type. User selection of search result 612 might also cause aerial view 630 to indicate where the hotel room is located relative to other hotel rooms in the hotel on the same floor.

In an embodiment, a web page that displays search results may include a "Reserve Now" link or button. For example, web page 600 includes a "Make a Reservation" link that, when selected, causes reservation information to be displayed. The reservation information indicates how the end-user can reserve a hotel room from the hotel. The reservation information may include a phone number of the corresponding hotel and, optionally, a series of one or more questions to ask of a hotel receptionist in order to reserve the hotel room. Alternatively, "Make a Reservation" link may be a link to a web site of the corresponding hotel, where the end-user can make a reservation.

As another example, user selection of a search result (or a "Reserve Now" button that corresponds to the search result) may cause information provided by web server 532 to be displayed, where the information (e.g., one or more web pages provided by web server 532) may allow an end-user to reserve the corresponding hotel room from the end-user's client device. In this way, web server 532 (or an associated process) acts on behalf of the end-user by obtaining information from the end-user and interacting with a hotel server ("transparently" to the end-user) to reserve the hotel room that corresponds to the search result.

As noted previously, hotel room data 534 may store one or more user reviews in association with a particular hotel room. A user review may be specific to a hotel room or may be about the hotel generally. Therefore, in an embodiment, to leverage those user reviews, a search result may include a user review or a link to one or more user reviews. A user review may be in any form, such as a number of stars or actual text from the user that created the user review.

Ranking Hotel Rooms

In an embodiment, prior to web server 532 providing, to a client device (e.g., client device 510A), a set of search results that are generated in response to receiving a search query, the corresponding set of hotel rooms are ranked based on one or more ranking criteria. The set of hotel rooms are ordered based on a rank score associated with each hotel room.

Figure 7A:
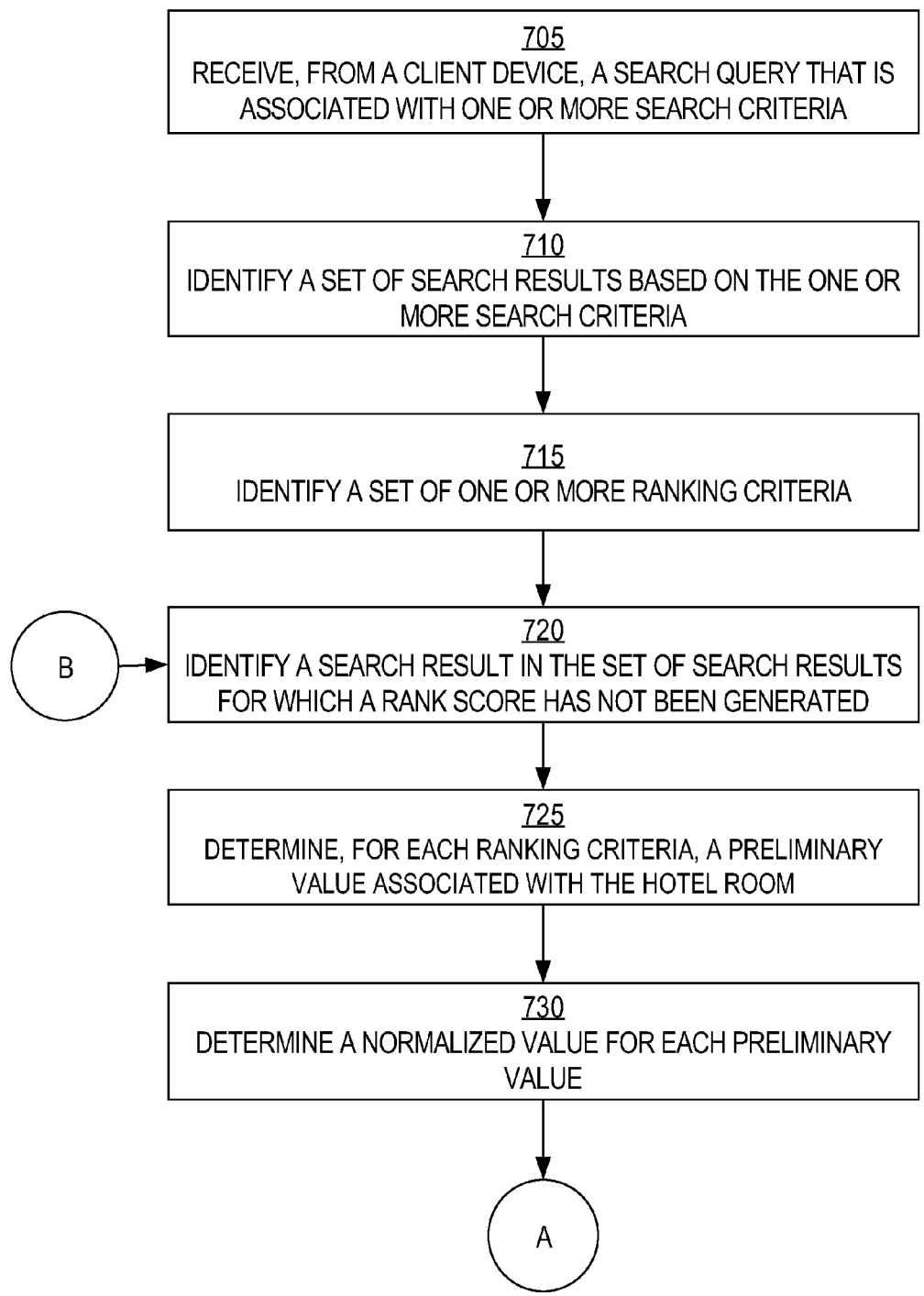
FIGS. 7A-7B are flow diagrams that depict a process for ranking a set of individual habitable units, according to an embodiment of the invention.
Figure 7B:
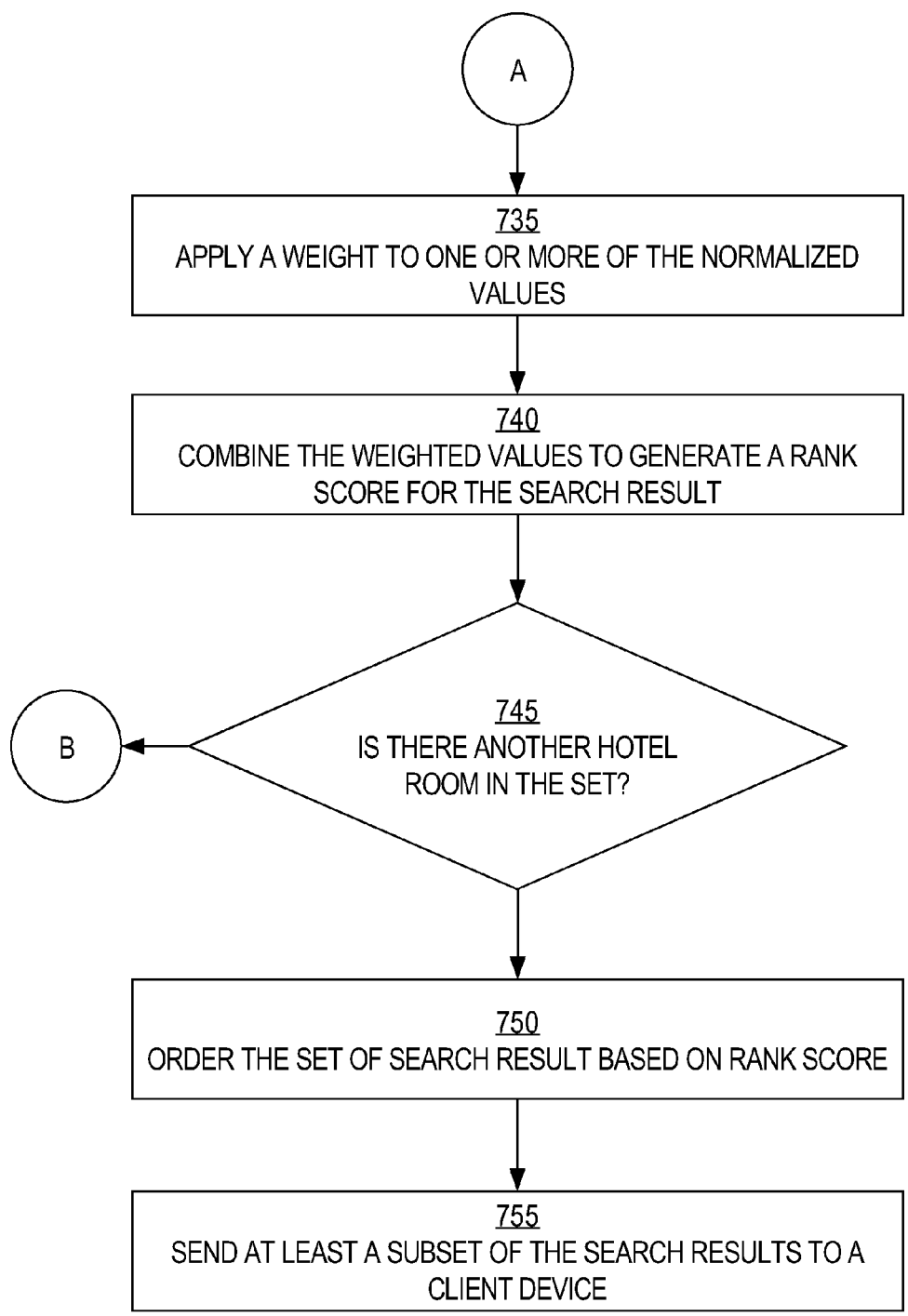
Figure 8:
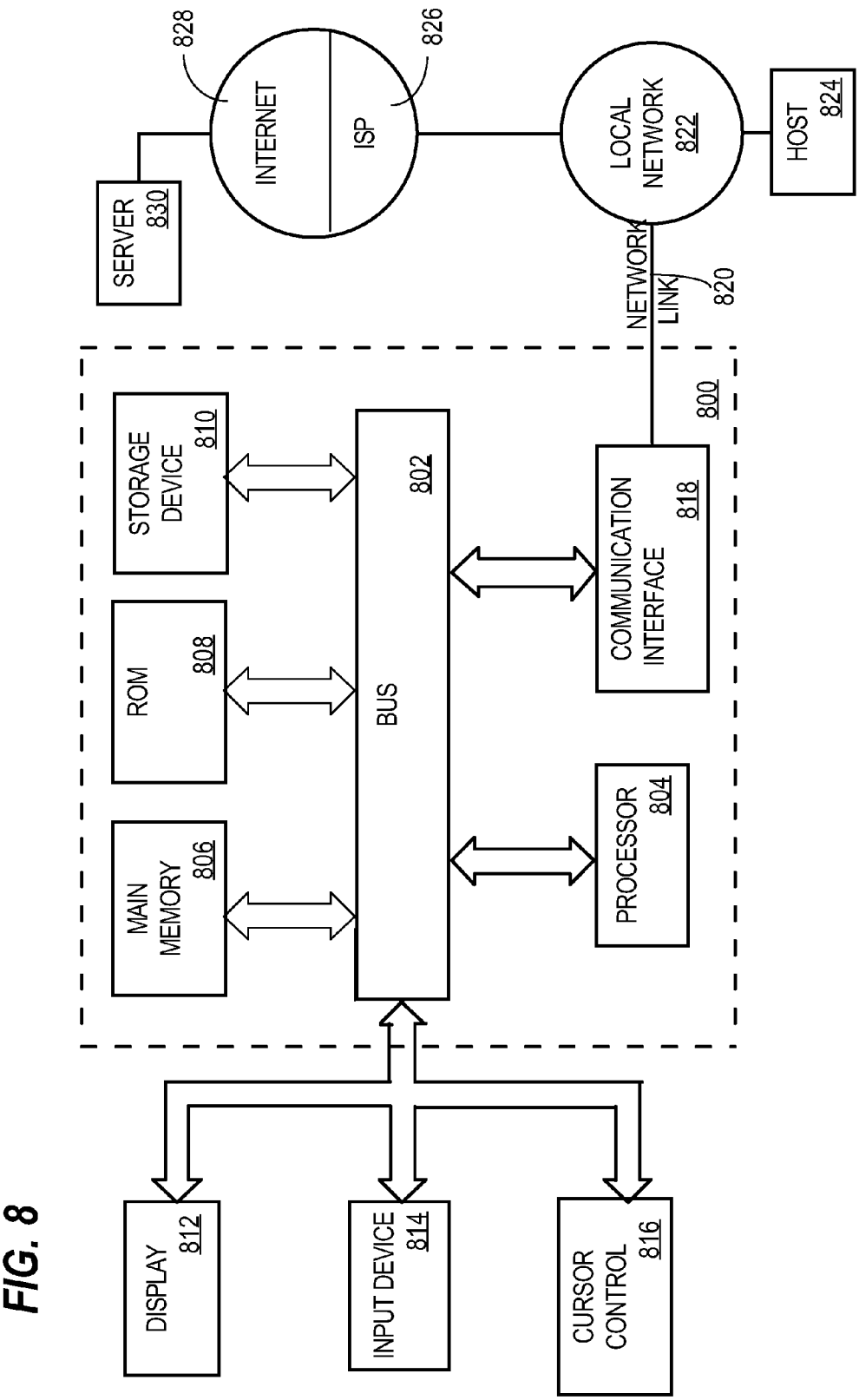
FIG. 8 is a block diagram that illustrates a computer system upon which an embodiment of the invention may be implemented.

FIGS. 7A-7B are flow diagrams that depict a process 700 for ranking a set of hotel rooms, according to an embodiment of the invention. Although process 700 is described as being performed by web server 532, one or more other processes associated with web server 532 may perform one or more of the steps of process 700.

At step 705, web server 532 receives a search query that is associated with a set of one or more search criteria. At least one search criterion in the set is a user-specified search criterion. One or more of the search criteria in the set may be default criteria.

At step 710, web server 532 identifies a set of search results based on the set of one or more search criteria. Each search result in the set corresponds to a different hotel room.

At step 715, web server 532 identifies a set of one or more ranking criteria. The set of one or more ranking criteria may be the same as or different than the set of one or more search criteria. For example, while a search query specifies a particular hotel chain in a particular city and that the view from a hotel room is important, web server 532 may use a hotel room price-to-hotel room size ratio as a ranking criterion in addition to using room view as a ranking criterion. As another example, search criteria associated with a search query might indicate that the end-user is interested in a high floor, a "good" view, elevators that are close, and a connecting room. After identifying a set of hotel rooms based on the search criteria, web server 532 might use these same criteria as the ranking criteria.

At step 720, web server 532 identifies, in the set of search result, a search result for which a rank score has not yet been generated.

At step 725, for each ranking criterion of the set of one or more ranking criteria, web server 532 determines a preliminary value for the ranking criterion associated with the hotel room identified in step 720. A ranking criterion corresponds to an attribute of a hotel room. Thus, the type of preliminary value varies depending on the type of criterion or room attribute. For example, if the ranking criterion is distance from an elevator, then a preliminary value for a particular hotel room might be 20 feet. If the ranking criterion is room size, then a preliminary value for a particular hotel room might be 500 ft². If the ranking criterion is room view, then a preliminary value for a particular hotel room might be 'good,' 'poor,' or 'none.' If the ranking criterion is floor, then a preliminary value for a particular hotel room might be 'high', 'low', or 'ground' and/or a specific value (e.g., '5') indicating the specific floor on which the particular hotel room is located.

At step 730, for each preliminary value determined in step 725, web server 532 determines a normalized value based on the preliminary value. Each normalized value determined for a particular hotel room is between two values, such as between 0 and 100 or between 0 and 1. Alternatively, a normalized value may be associated with a hotel room prior to receiving a search query where web server 532 uses the normalized value. Thus, a preliminary value does not have to be determined. In other words, step 725 may be unnecessary.

At step 735, for each normalized value determined at step 730, web server 532 applies a weight to the normalized value. For example, step 730 results in three normalized values: 0.9, 0.6, and 0.3. If the first two ranking criteria are considered twice as important as the third ranking criteria, then the following weights may be applied, respectively, to the three ranking criteria: 2, 2, and 1. In other words, both 0.9 and 0.6 are multiplied by 2 and 0.3 is not modified. However, if each ranking criterion is considered equal in importance relative to each other ranking criterion, then this step is unnecessary.

A weight that is determined for a ranking criterion may be based on whether a search query specified the ranking criterion. For example, if a search query specified that room view is important but that a connecting room is not important, then a positive weight (e.g., >1.0) is applied to the normalized value associated with the room view attribute of a particular hotel room while no weight (or a negative weight) is applied to the normalized value associated with the connecting room attribute of the particular hotel room.

Additionally or alternatively, a weight that is determined for a ranking criterion may be pre-defined or established prior to web server 532 receiving the search query. For example, if room view is not specified in the search query and room view is used as a ranking criterion, then a weight for the room view ranking criterion might be 1.5; otherwise, if room view was specified in the search query, then a weight for the room view ranking criterion might be 2.0.

At step 740, web server 532 combines the weighted values generated in step 735 to generate a rank score for the hotel room. Web server 532 associates the rank score with the hotel room. The weighted values may be combined by simply adding the weighted values generated in step 735. Alternatively, one or more of the outliers may be removed. For example, the lowest weighted value and the highest weighted value may be removed before the remaining weighted values are combined.

At step 745, web server 532 determines whether there is another hotel room (in the set of hotel rooms identified in step 720) for which a rank score has not yet been generated. If so, then process 700 proceeds to step 720. If not, then process 700 proceeds to step 750.

At step 750, web server 532 orders the set of hotel rooms based on the rank score associated with each hotel room in the set.

At step 755, web server 532 sends at least a subset of the set of hotel rooms to a client device (e.g., client device 510A) that submitted the search query (or to another client device).

For example, an end-user of client device 510A forms a search query that specifies San Francisco as a city, room size of at least 500 square feet, the view from a hotel room as important, a connecting room as not important, floor level as "high," and distance to elevators of less than 50 feet. Client device 510A sends the search query over network 520 to web server 532. Web server 532 identifies only those hotel rooms that are located in San Francisco, are at least 500 square feet in size, and are within 50 feet from an elevator. Web server 532 ranks the identified hotel rooms based on their respective views and how close the hotel rooms are to an elevator. A view from a hotel room may be classified as being associated with one of three preliminary "values": no view, poor view, or good view. If an identified hotel room has a good view, then a normalized value for that preliminary value might be a '1.0' (indicating a perfect score). A "poor view" may be assigned a normalized value of '0.2' and "no view" may be assigned a normalized value of '0.'

With respect to distance from elevators, a hotel room that is within 10 feet of an elevator may be assigned a normalized value of '1', a hotel room that is between 10 feet and 20 feet may be assigned a normalized value of '0.9', a hotel room that is between 20 feet and 30 feet may be assigned a normalized value of '0.8' and so forth.

Match Indicator

In an embodiment, a set of search results may indicate how well each search result "matches" the search criteria specified in the search query. For example, a search result may indicate a percentage match (e.g., "100%" or "22%") or a qualitative match (e.g., "Perfect," "Good" or "Poor"), which is based on objective factors. For example, as part of the ranking process, web server 532 determines what a perfect rank score would be given the weights. A perfect score would be a, for example, 1.0 for the normalized value for each attribute, where the appropriate weight is applied to each normalized value. The resulting value might be 1.0*2+1.0*2+1.0*1=5. Each rank score associated with each search result is compared to (e.g., divided by) the perfect score to derive a percentage match. Either the percentage match or an indication of the quality of the match is indicated in the search result that is displayed on a client device.

Hotel Room Availability

An end-user that submits a search query against hotel room data 534 may desire to reserve a hotel room for a specific date (e.g., Nov. 26, 2012) or a specific date range (e.g., October 12 to October 23). Thus, in an embodiment, an end-user may include date information in a search query and, in response to receiving the search query, web server 532 may provide, to the end-user, only information about hotel rooms that are available on the date(s) indicated in the date information. In other words, if a particular hotel room is not available on a proposed reservation date indicated in a search query, then information about the particular hotel room is not displayed to an end-user that formulated the search query, even if the particular hotel room would have been the best match based on the search criteria associated with the search query.

In an embodiment, the availability of one or more hotel rooms is determined by web server 532 in response to a search query from a client device. For example, web server 532 identifies a set of hotel rooms that satisfy search criteria associated with a search query. Web server 532 then sends a request to a remote hotel server maintained by a hotel from which the set of hotel rooms are located. The request includes identification data that identifies each room in the set of hotel rooms, for example, by room number and date data that identifies one or more dates for which a reservation is sought. The hotel server has access to availability date that indicates, for each hotel room in the set, whether the hotel room is available to be reserved on any particular date. In response to the request from web server 532, the hotel server sends, to web server 532, a response that indicates whether each of the hotel rooms is available for the date(s) indicated. In response, web server 532 might filter the search results based on the availability data from the hotel server and send the filtered search results to the client device.

As another example, hotel room records in hotel room data 534 are updated to reflect when the corresponding hotel rooms are available prior to receiving a search query that targets any of the corresponding hotel rooms. In other words, processing a search query against hotel room data 534 does not trigger the sending of a request to one or more remote hotel servers for hotel room availability. Hotel room records in hotel room data 534 may be updated in a similar manner described above, such as web server 532 (or another process), sending a request to one or more hotel servers to retrieve availability data of multiple hotel rooms from each corresponding hotel. However, the request may not include any specific date restrictions. Instead, each request sent to a different hotel server may retrieve availability data for the next, for example, 6 months. Each hotel server (corresponding to a different hotel) may be accessed periodically, such as once per week or once per day.

The former example may be advantageous relative to the latter example at least due to the fact that the knowledge of the availability of hotel rooms is not as stale. This is so because room availability of a set of hotel rooms is determined from the source (i.e., the hotel server(s)) at the time a search query that targets information about the set of hotel rooms is processed.

Searching Hotel Rooms

Approaches exist for searching for information about houses and rental properties. For example, Zillow.com and vrbo.com provide a search feature to search for houses to buy and units to rent, respectively. However, buying and renting are very different activities compared to reserving a hotel room. In terms of houses, apartments, and condominiums, the specific house, apartment, or condo is negotiated from the very beginning of the buying process. For example, a home buyer interacts directly with a home owner (or through their respective representatives) to negotiate an agreement. In contrast, with respect to reserving a hotel room, the specific hotel room is not known to a prospective hotel patron until after he/she has made a reservation and the (now actual) hotel patron shows up (or just prior to showing up) at the hotel room. Instead, a prospective hotel patron negotiates with a hotel representative (or shops using an online service) for reserving some hotel room that belongs to a specific room category. Thus, rental negotiations for a hotel generally take place at the room-category level of granularity, whereas purchase or rental negotiations for homes/apartments/condos occur relative to a specific housing unit.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 710. Volatile media includes dynamic memory, such as main memory 706. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:

while a first image of a single floor of an existing multi-unit facility is being displayed, receiving, through a drawing component, first input to create a marked-up first image using a drawing tool;

wherein the first image depicts a floor with existing one or more rooms;

wherein the first input marks up the first image to indicate at least one location and boundary, on the-single floor, for each individual habitable unit of a plurality of individual habitable units that are depicted in the first image;

displaying a base image that depicts an actual geographic area on which resides the existing multi-unit facility;

wherein a mapping between points on the base image and a plurality of actual geographic coordinates has been established;

while the base image is displayed, receiving, through a fitting component, second input that associates one or more first positions in the marked-up first image with one or more second positions in the base image;

based on (a) the marked-up first image, (b) the position of the marked-up first image on the base image, and (c) the mapping between the points on the base image and the plurality of actual geographic coordinates, automatically determining a set of actual geographic coordinates for each individual habitable unit of the plurality of individual habitable units;

wherein the step of automatically determining assigns the same particular set of actual geographic coordinates to a set of corresponding individual habitable units;

wherein the individual habitable units that belong to the set of corresponding individual habitable units reside at the same location, but on different floors, within the existing multi-unit facility;

further comprising, after automatically determining the set of actual geographic coordinates for a particular individual habitable unit of the plurality of individual habitable units:

receiving a visual information that depicts a possible view, from a window of the particular individual habitable unit, away from the existing multi-unit facility; and storing data that associates the visual information with the particular individual habitable unit;

wherein the method is performed by one or more computing devices.

2. The method of claim 1, wherein the base image is a satellite image of the geographic area.

3. The method of claim 1, wherein:

the base image depicts some but not all boundaries of the plurality of individual habitable units; and the boundaries indicated in the first input include at least one boundary that is not depicted in the base image.

4. The method of claim 1, wherein the visual information is one of video, a computer-rendered image, or a digital photo.

5. The method of claim 1, further comprising, prior to receiving the visual information, sending, to a third party service, a request that includes the set of actual geographic coordinates for the particular individual habitable unit, wherein the visual information is received from the third party service.

6. A method comprising:

while displaying a first image of a floor plan of an existing multi-floor building and that indicates a plurality of individual habitable units, receiving, through a drawing component, first input to create a marked-up first image, wherein the first image depicts a floor with existing one or more rooms;

wherein the first input marks up the first image, using the drawing component, to indicate one or more boundaries of each individual habitable unit of the plurality of individual habitable units;

wherein the actual geographic area of each individual habitable unit of the plurality of individual habitable units is distinct relative to the actual geographic area of each other individual habitable unit of the plurality of individual habitable units;

while the marked-up first image is displayed, receiving, through a labeling component, second input that specifies attribute values for each individual habitable unit of the plurality of individual habitable units;

in response to receiving the second input, associating each individual habitable unit, of the plurality of individual habitable units, with the corresponding attribute values; and storing, in a database, data that associates each individual habitable unit, of the plurality of individual habitable units, with the corresponding attribute values;

wherein the second input specifies a particular attribute value;

wherein the step of storing assigns the same particular attribute value to a batch of individual habitable units without a user individually specifying the particular attribute value for each individual habitable unit in the batch;

the plurality of individual habitable units are a first plurality of individual habitable units that correspond to a first floor of the existing multi-floor building;

a particular plurality of values are specified by a user for a particular individual habitable unit of the first plurality of individual habitable units;

storing the data comprises storing data that associates each individual habitable unit, of a second plurality of individual habitable units that are different than the first plurality of individual habitable units and that correspond to one or more floors, of the existing multi-floor building, that do not include the first floor, with the particular plurality of values;

the particular plurality of values are not specified by the user for each individual habitable unit of the second plurality of individual habitable units;

wherein the method is performed by one or more computing devices.

7. The method of claim 6, further comprising, prior to receiving the second input, receiving, through a fitting component, third input that aligns a display of the marked-up first image relative to a display of a base image that depicts an actual geographic area on which resides the plurality of individual habitable units, such that contents depicted in the marked-up first image are displayed in alignment with corresponding contents depicted in the base image.

8. The method of claim 6, wherein the corresponding attribute values of said each individual habitable unit include a room number for said each individual habitable unit.

9. The method of claim 6, wherein the corresponding attribute values of said each individual habitable unit indicate a type of each bed of one or more beds in said each individual habitable unit.

10. The method of claim 7, further comprising:

after receiving the third input, determining, based on boundaries of each individual habitable unit of the plurality of individual habitable units and the base image, a size of said each individual habitable unit;

wherein the corresponding attribute values of said each individual habitable unit include the size of said each individual habitable unit.

11. The method of claim 6, wherein:

the plurality of individual habitable units include a first individual habitable unit and a second individual habitable unit;

the first individual habitable unit is of a first type and the second individual habitable unit is of a second type that is different than the first type;

the corresponding attribute values for the first individual habitable unit indicate a first category that indicates the first type and, for the second individual habitable unit, a second category that indicates the second type.

12. The method of claim 7, further comprising, after receiving the third input, for each individual habitable unit of a subset of the plurality of individual habitable units:

receiving visual information that depicts a possible view from a window of said each individual habitable unit, wherein the possible view of said each individual habitable unit is away from said each individual habitable unit; and storing data that associates the visual information with said each individual habitable unit.

13. The method of claim 12, wherein the visual information is received from a third party in response to a request for the visual information, wherein the request includes multiple geographical coordinates.

14. The method of claim 13, further comprising:

determining an elevation of a particular individual habitable unit, wherein the request includes the elevation.

15. The method of claim 12, wherein receiving visual information comprises receiving, for a certain individual habitable unit of the plurality of individual habitable units, a plurality of visual information items that each depicts a different possible view from a window of the certain individual habitable unit.

16. The method of claim 7, further comprising, after receiving the third input:

receiving an image that depicts an actual view from a window of a certain individual habitable unit of the plurality of individual habitable units; and storing data that associates the image with the certain individual habitable unit.

17. The method of claim 7, further comprising, after generating the marked-up first image, receiving third input that rotates and scales the marked-up first image.

18. The method of claim 6, wherein the plurality of individual habitable units comprise a first subset that are managed by a first establishment and a second subset that are managed by a second establishment that is different than the first establishment.

19. The method of claim 6, wherein the plurality of individual habitable units are hotel rooms.

20. One or more non-transitory storage media storing instructions which, when executed by one or more processors, cause performance of the method recited in claim 1.

21. One or more non-transitory storage media storing instructions which, when executed by one or more processors, cause performance of the method recited in claim 2.

22. One or more non-transitory storage media storing instructions which, when executed by one or more processors, cause performance of the method recited in claim 3.

23. One or more non-transitory storage media storing instructions which, when executed by one or more processors, cause performance of the method recited in claim 4.

24. One or more non-transitory storage media storing instructions which, when executed by one or more processors, cause performance of the method recited in claim 5.

25. One or more non-transitory storage media storing instructions which, when executed by one or more processors, cause performance of the method recited in claim 6.

26. One or more non-transitory storage media storing instructions which, when executed by one or more processors, cause performance of the method recited in claim 7.

27. One or more non-transitory storage media storing instructions which, when executed by one or more processors, cause performance of the method recited in claim 8.

28. One or more non-transitory storage media storing instructions which, when executed by one or more processors, cause performance of the method recited in claim 9.

29. One or more non-transitory storage media storing instructions which, when executed by one or more processors, cause performance of the method recited in claim 10.

30. One or more non-transitory storage media storing instructions which, when executed by one or more processors, cause performance of the method recited in claim 11.

31. One or more non-transitory storage media storing instructions which, when executed by one or more processors, cause performance of the method recited in claim 12.

32. One or more non-transitory storage media storing instructions which, when executed by one or more processors, cause performance of the method recited in claim 13.

33. One or more non-transitory storage media storing instructions which, when executed by one or more processors, cause performance of the method recited in claim 14.

34. One or more non-transitory storage media storing instructions which, when executed by one or more processors, cause performance of the method recited in claim 17.

35. One or more non-transitory storage media storing instructions which, when executed by one or more processors, cause performance of the method recited in claim 16.

36. One or more non-transitory storage media storing instructions which, when executed by one or more processors, cause performance of the method recited in claim 17.

37. One or more non-transitory storage media storing instructions which, when executed by one or more processors, cause performance of the method recited in claim 18.

38. One or more non-transitory storage media storing instructions which, when executed by one or more processors, cause performance of the method recited in claim 19.

39. The method of claim 1, wherein the at least one location, for each individual habitable unit of the plurality of individual habitable units, includes boundaries of said each individual habitable unit of the plurality of individual habitable units.

40. One or more non-transitory storage media storing instructions which, when executed by one or more processors, cause performance of the method recited in claim 39.

41. The method of claim 6, wherein receiving the second input comprises receiving input that selects each individual habitable unit in the batch.

42. The method of claim 6, wherein receiving the second input comprises receiving input that specifies a tag rule that includes the particular attribute value and a pattern, wherein each individual habitable unit in the batch matches the pattern.

43. One or more non-transitory storage media storing instructions which, when executed by one or more processors, cause performance of the method recited in claim 41.

44. One or more non-transitory storage media storing instructions which, when executed by one or more processors, cause performance of the method recited in claim 42.

* * * * *